(12) United States Patent
Wang et al.

(10) Patent No.: US 12,210,139 B2
(45) Date of Patent: Jan. 28, 2025

(54) OPTICAL PHOTOGRAPHING SYSTEM AND IMAGE CAPTURING UNIT

(71) Applicant: LARGAN PRECISION CO., LTD., Taichung (TW)

(72) Inventors: Kuan Chun Wang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 677 days.

(21) Appl. No.: 17/511,395

(22) Filed: Oct. 26, 2021

(65) Prior Publication Data

US 2023/0086139 A1   Mar. 23, 2023

(30) Foreign Application Priority Data

Sep. 17, 2021  (TW) .................................. 110134863

(51) Int. Cl.
  *G02B 13/00*  (2006.01)
  *G02B 9/64*  (2006.01)
  (Continued)

(52) U.S. Cl.
  CPC ........... *G02B 13/0045* (2013.01); *G02B 9/64* (2013.01); *G02B 13/006* (2013.01); *H04N 23/55* (2023.01)

(58) Field of Classification Search
  CPC .... G02B 9/64; G02B 13/0045; G02B 13/006; G02B 23/24; G02B 23/243; H04N 23/55
  (Continued)

(56) References Cited

U.S. PATENT DOCUMENTS 9,989,732  B1   6/2018  Fu
11,340,430  B2 *  5/2022  Chen ..................... G02B 9/64
(Continued)

FOREIGN PATENT DOCUMENTS

CN   107167898 A   9/2017
CN   108241202 A   7/2018
(Continued)

OTHER PUBLICATIONS

Gross, Herbert. Handbook of Optical Systems vol. 3: Aberration Theory and Correction of Optical Systems. 2007. Wiley-VCH Verlag GmbH & Co. pp. 378-379 (Year: 2007).*
(Continued)

*Primary Examiner* — Marin Pichler
(74) *Attorney, Agent, or Firm* — Maschoff Brennan

(57) ABSTRACT

An optical photographing system includes eight lens elements which are, in order from an object side to an image side along an optical path: a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side. The object-side surface of the third lens element is concave in a paraxial region thereof. The fourth lens element has positive refractive power. The fifth lens element has positive refractive power. The sixth lens element has positive refractive power. The seventh lens element has negative refractive power, and the image-side surface of the seventh lens element is concave in a paraxial region thereof.

24 Claims, 21 Drawing Sheets

(51) Int. Cl.
   *H04N 5/225* (2006.01)
   *H04N 23/55* (2023.01)
(58) Field of Classification Search
   USPC .................................. 359/738, 739, 740, 754
   See application file for complete search history.

(56) References Cited

U.S. PATENT DOCUMENTS

| | | | |
|---|---|---|---|
| 11,835,691 B2* | 12/2023 | Hsieh | G02B 9/64 |
| 11,966,025 B2* | 4/2024 | Li | G02B 13/0045 |
| 2018/0213151 A1 | 7/2018 | Joujiki et al. | |
| 2020/0012078 A1* | 1/2020 | Kuo | G02B 13/0045 |
| 2021/0055519 A1 | 2/2021 | Wei et al. | |
| 2022/0236541 A1 | 7/2022 | Kurokawa et al. | |

FOREIGN PATENT DOCUMENTS

| | | | | |
|---|---|---|---|---|
| CN | 111258035 A | | 6/2020 | |
| CN | 111596442 A | * | 8/2020 | |
| CN | 111796402 A | * | 10/2020 | G02B 1/00 |
| CN | 211979308 U | | 11/2020 | |
| CN | 213182175 U | | 5/2021 | |
| CN | 113267871 A | * | 8/2021 | |
| CN | 114114652 A | | 3/2022 | |
| JP | 2018120125 A | | 8/2018 | |
| TW | 201823793 A | | 7/2018 | |
| WO | 2021189463 A | | 9/2021 | |
| WO | 2022047109 A | | 3/2022 | |
| WO | 2022/164821 A1 | | 8/2022 | |

OTHER PUBLICATIONS

CN111596442 Machine Translation (Year: 2024).*
CN111796402A Machine Translation (Year: 2024).*
English language machine translation of Cai et al. CN-113267871-A (Year: 2021).*
European Office Action dated Apr. 12, 2022 as received in application No. 21207158.3.

* cited by examiner

OPTICAL PHOTOGRAPHING SYSTEM AND IMAGE CAPTURING UNIT

RELATED APPLICATIONS

This application claims priority to Taiwan Application 110134863, filed on Sep. 17, 2021, which is incorporated by reference herein in its entirety.

BACKGROUND

Technical Field

The present disclosure relates to an optical photographing system and an image capturing unit, more particularly to an optical photographing system applicable to an image capturing unit.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, image capturing units equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical photographing system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the third lens element is concave in a paraxial region thereof. The fourth lens element has positive refractive power. The fifth lens element has positive refractive power, and the image-side surface of the fifth lens element is convex in a paraxial region thereof. The sixth lens element has positive refractive power. The seventh lens element has negative refractive power, and the image-side surface of the seventh lens element is concave in a paraxial region thereof.

When a sum of central thicknesses of all lens elements of the optical photographing system is $\Sigma CT$, and a sum of axial distances between each of all adjacent lens elements of the optical photographing system is $\Sigma AT$, the following condition is satisfied:

$$3.0 < \Sigma CT/\Sigma AT.$$

According to one aspect of the present disclosure, an optical photographing system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has negative refractive power. The object-side surface of the third lens element is concave in a paraxial region thereof. The fourth lens element has positive refractive power. The fifth lens element has positive refractive power. The sixth lens element has positive refractive power, and the image-side surface of the sixth lens element is convex in a paraxial region thereof. The seventh lens element has negative refractive power, and the image-side surface of the seventh lens element is concave in a paraxial region thereof.

When a sum of central thicknesses of all lens elements of the optical photographing system is $\Sigma CT$, and a sum of axial distances between each of all adjacent lens elements of the optical photographing system is $\Sigma AT$, the following condition is satisfied:

$$2.5 < \Sigma CT/\Sigma AT.$$

According to one aspect of the present disclosure, an optical photographing system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has negative refractive power. The third lens element has negative refractive power, and the object-side surface of the third lens element is concave in a paraxial region thereof. The fourth lens element has positive refractive power. The fifth lens element has positive refractive power. The sixth lens element has positive refractive power. The seventh lens element has negative refractive power, and the image-side surface of the seventh lens element is concave in a paraxial region thereof.

When a sum of central thicknesses of all lens elements of the optical photographing system is $\Sigma CT$, and a sum of axial distances between each of all adjacent lens elements of the optical photographing system is $\Sigma AT$, the following condition is satisfied:

$$2.5 < \Sigma CT/\Sigma AT.$$

According to another aspect of the present disclosure, an image capturing unit includes one of the aforementioned optical photographing systems and an image sensor, wherein the image sensor is disposed on an image surface of the optical photographing system.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
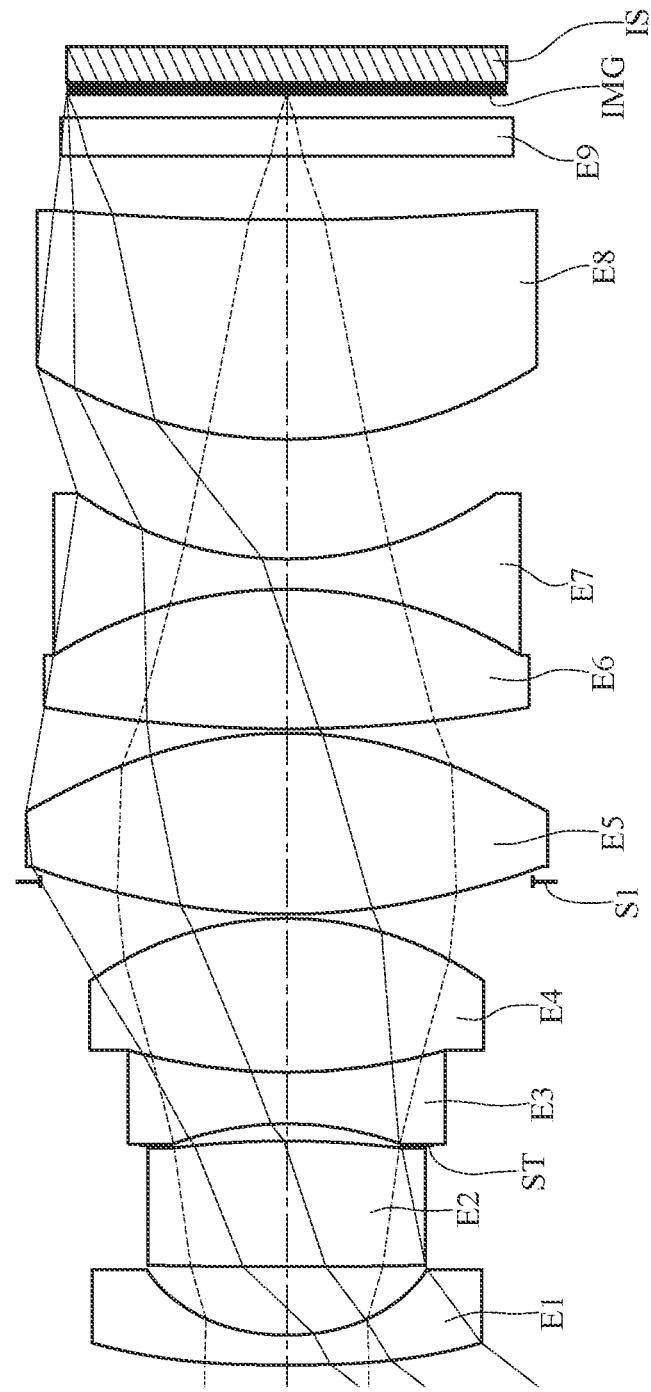
FIG. 1 is a schematic view of an image capturing unit according to the 1st embodiment of the present disclosure.

An optical photographing system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element can have negative refractive power. Therefore, it is favorable for adjusting the refractive power configuration of the optical photographing system so as to increase the field of view thereof. The object-side surface of the first lens element can be convex in a paraxial region thereof. Therefore, it is favorable for adjusting the direction of light incident into the optical photographing system so as to increase the field of view. The image-side surface of the first lens element can be concave in a paraxial region thereof. Therefore, it is favorable for adjusting the lens shape and the refractive power of the first lens element so as to correct aberrations such as astigmatism.

The third lens element can have negative refractive power. Therefore, it is favorable for balancing the refractive power configuration at the object side of the optical photographing system, and it is also favorable for increasing the field of view and correcting aberrations. The object-side surface of the third lens element is concave in a paraxial region thereof. Therefore, it is favorable for adjusting the direction of light so as to increase the aperture.

The fourth lens element has positive refractive power. Therefore, it is favorable for miniaturization at the object side of the optical photographing system. The image-side surface of the fourth lens element can be convex in a paraxial region thereof. Therefore, it is favorable for adjusting the direction of light, thereby balancing the distribution of the outer diameters of the optical photographing system.

The fifth lens element has positive refractive power. Therefore, it is favorable for adjusting the refractive power configuration of the optical photographing system so as to obtain a balance between the field of view and the size distribution. The object-side surface of the fifth lens element can be convex in a paraxial region thereof. Therefore, it is favorable for the fifth lens element combining with the fourth lens element so as to increase image quality at the wild field of view. The image-side surface of the fifth lens element can be convex in a paraxial region thereof. Therefore, it is favorable for adjusting the direction of light so as to reduce outer diameters at the image side of the optical photographing system.

The sixth lens element has positive refractive power. Therefore, it is favorable for miniaturization at the image side of the optical photographing system. The image-side surface of the sixth lens element can be convex in a paraxial region thereof. Therefore, it is favorable for the sixth lens element combining with the seventh lens element so as to correct aberrations.

The seventh lens element has negative refractive power. Therefore, it is favorable for balancing the refractive power configuration at the image side of the optical photographing system so as to correct aberrations such as spherical aberration. The object-side surface of the seventh lens element can be concave in a paraxial region thereof. Therefore, it is favorable for the seventh lens element combining with the sixth lens element so as to correct aberrations. The image-side surface of the seventh lens element is concave in a paraxial region thereof. Therefore, it is favorable for reducing the incident angle on the image surface so as to increase response efficiency of the image sensor.

According to the present disclosure, the third lens element and the fourth lens element can be cemented to each other. Therefore, it is favorable for correcting aberrations such as chromatic aberration and reducing assembly difficulty so as to increase yield rate. According to the present disclosure, the sixth lens element and the seventh lens element can be cemented to each other. Therefore, it is favorable for correcting aberrations such as chromatic aberration and reducing assembly difficulty so as to increase yield rate.

When a sum of central thicknesses of all lens elements of the optical photographing system is $\Sigma CT$, and a sum of axial distances between each of all adjacent lens elements of the optical photographing system is $\Sigma AT$, the following condition is satisfied: $2.5 < \Sigma CT/\Sigma AT$. Therefore, it is favorable for adjusting the lens configuration, thereby reducing the total track length of the optical photographing system. Moreover, the following condition can also be satisfied: $3.0<\Sigma CT/\Sigma AT$. Moreover, the following condition can also be satisfied: $3.5<\Sigma CT/\Sigma AT$. Moreover, the following condition can also be satisfied: $4.0<\Sigma CT/\Sigma AT$. Moreover, the following condition can also be satisfied: $\Sigma CT/\Sigma AT<20$. Moreover, the following condition can also be satisfied: $\Sigma CT/\Sigma AT<15$. Moreover, the following condition can also be satisfied: $\Sigma CT/\Sigma AT<10$. Moreover, the following condition can also be satisfied: $3.0<\Sigma CT/\Sigma AT<20$. Moreover, the following condition can also be satisfied: $3.5<\Sigma CT/\Sigma AT<15$.

When a maximum image height of the optical photographing system (which can be half of a diagonal length of an effective photosensitive area of an image sensor) is ImgH, and an entrance pupil diameter of the optical photographing system is EPD, the following condition can be satisfied: $1.1<ImgH/EPD<2.3$. Therefore, it is favorable for obtaining a balance between large image surface and large aperture.

Figure 18:
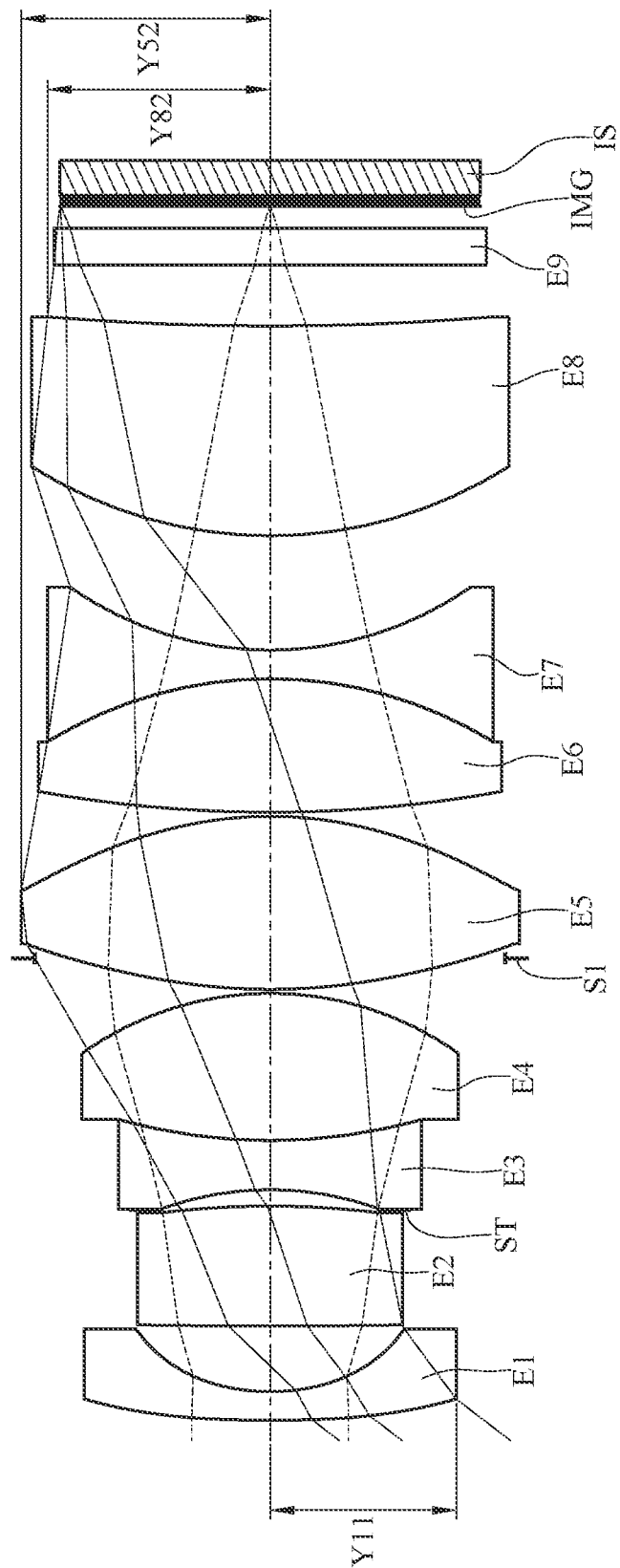
FIG. 18 shows a schematic view of Y11, Y52, Y82 according to the 1st embodiment of the present disclosure.

When a maximum effective radius of the object-side surface of the first lens element is Y11, and a maximum effective radius of the image-side surface of the eighth lens element is Y82, the following condition can be satisfied: $0.70<Y11/Y82<1.0$. Therefore, it is favorable for adjusting the ratio of outer diameters of the lens elements so as to obtain a balance among the field of view, the size distribution and the size of the image surface. Please refer to FIG. 18, which shows a schematic view of Y11 and Y82 according to the 1st embodiment of the present disclosure.

According to the present disclosure, the optical photographing system can further include an aperture stop. When an axial distance between the aperture stop and the image surface is SL, and an axial distance between the object-side surface of the first lens element and the image surface is TL, the following condition can be satisfied: $0.75<SL/TL<0.90$. Therefore, it is favorable for adjusting the position of the aperture stop so as to obtain a balance between the field of view and the size distribution.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, and the object-side surface and the image-side surface of at least one lens element of the optical photographing system can be both aspheric, the at least one lens element can satisfy the following condition: $20.0<Vi/Ni<35.0$, wherein i=1, 2, 3, 4, 5, 6, 7 or 8. Therefore, it is favorable for adjusting the material and the lens shape of the lens element so as to miniaturize the lens element and increase image quality. Moreover, the object-side surfaces and the image-side surfaces of at least two lens elements of the optical photographing system can be all aspheric, and the at least two lens elements can satisfy the following condition: $20.0<Vi/Ni<35.0$, wherein i=1, 2, 3, 4, 5, 6, 7 or 8.

When a central thickness of the sixth lens element is CT6, and an axial distance between the fourth lens element and the fifth lens element is T45, the following condition can be satisfied: $28.0<CT6/T45<100$. Therefore, it is favorable for adjusting the configuration of lens elements so as to reduce the size at the image side of the optical photographing system.

When a maximum value among central thicknesses of all lens elements of the optical photographing system is CTmax, and a maximum value among axial distances between each of all adjacent lens elements of the optical photographing system is ATmax, the following condition can be satisfied: $1.3<CTmax/ATmax<5.5$. Therefore, it is favorable for adjusting the configuration of lens elements so as to miniaturize the optical photographing system. Moreover, the following condition can also be satisfied: $1.6<CTmax/ATmax<4.6$.

When an axial distance between the first lens element and the second lens element is T12, an axial distance between the second lens element and the third lens element is T23, and a central thickness of the second lens element is CT2, the following condition cab be satisfied: $0.45<(T12+T23)/CT2<1.5$. Therefore, it is favorable for adjusting the configuration of lens elements so as to increase the field of view and reduce the size at the object side of the optical photographing system.

When the axial distance between the object-side surface of the first lens element and the image surface is TL, and a focal length of the optical photographing system is f, the following condition can be satisfied: $4.0<TL/f<5.5$. Therefore, it is favorable for obtain a balance between the optical total track length and the field of view.

When the axial distance between the object-side surface of the first lens element and the image surface is TL, and the maximum image height of the optical photographing system is ImgH, the following condition can be satisfied: $5.0<TL/ImgH<6.5$. Therefore, it is favorable for obtain a balance between the optical total track length and the size of the image surface.

When a maximum value among maximum effective radii on the object-side surfaces and the image-side surfaces of all lens elements of the optical photographing system is Ymax, and a minimum value among maximum effective radii on the object-side surfaces and the image-side surfaces of all lens elements of the optical photographing system is Ymin, the following condition can be satisfied: $2.0<Ymax/Ymin<2.5$. Therefore, it is favorable for adjusting the outer diameter distribution of lens elements so as to obtain a balance between the increase in the aperture and reduction in the size.

When the Abbe number of the sixth lens element is V6, and the Abbe number of the seventh lens element is V7, the following condition can be satisfied: $1.6<V6/V7<2.6$. Therefore, it is favorable for combining the sixth lens element and the seventh lens element so as to correct chromatic aberration.

When the focal length of the optical photographing system is f, and a composite focal length of the sixth lens element and the seventh lens element is f67, the following condition can be satisfied: $-1.0<f/f67<0$. Therefore, it is favorable for combining the sixth lens element and the seventh lens element so as to correct aberrations.

When an axial distance between the object-side surface of the first lens element and the image-side surface of the eighth lens element is TD, and the axial distance between the second lens element and the third lens element is T23, the following condition can be satisfied: $35.0<TD/T23$. Therefore, it is favorable for adjusting the lens configuration for miniaturization. Moreover, the following condition can also be satisfied: $40.0<TD/T23<100$.

When the focal length of the optical photographing system is f, and a focal length of the first lens element is f1, the following condition can be satisfied: $-1.0<f/f1<-0.60$. Therefore, it is favorable for adjusting the refractive power of the first lens element so as to obtain a balance between the increase in the field of view and the reduction in the lens outer diameter.

When the focal length of the optical photographing system is f, and a focal length of the fifth lens element is f5, the following condition can be satisfied: $0.30<f/f5<1.0$. Therefore, it is favorable for adjusting the refractive power of the fifth lens element so as to reduce the size.

When the maximum effective radius of the object-side surface of the first lens element is Y11, and a maximum effective radius of the image-side surface of the fifth lens element is Y52, the following condition can be satisfied: $0.50<Y11/Y52<1.1$. Therefore, it is favorable for adjusting the direction of light at the object side of the optical photographing system so as to reduce the outer diameter of the object side. Please refer to FIG. 18, which shows a schematic view of Y11 and Y52 according to the 1st embodiment of the present disclosure.

When the Abbe number of the third lens element is V3, and the Abbe number of the fourth lens element is V4, the following condition can be satisfied: $1.1<V4/V3<2.5$. Therefore, it is favorable for combining the third lens element and the fourth lens element so as to correct chromatic aberration.

When the focal length of the optical photographing system is f, and a composite focal length of the third lens element and the fourth lens element is f34, the following condition can be satisfied: $|f/f34|<0.25$. Therefore, it is favorable for combining the third lens element and the fourth lens element so as to increase the field of view and correct aberrations.

When a curvature radius of the object-side surface of the first lens element is R1, and a curvature radius of the image-side surface of the first lens element is R2, the following condition can be satisfied: $5.7<R1/R2$. Therefore, it is favorable for adjusting the lens shape and the refractive power of the first lens element so as to increase the field of view. Moreover, the following condition can also be satisfied: $7.2<R1/R2$.

When an f-number of the optical photographing system is Fno, the following condition can be satisfied: $1.2<Fno<2.0$. Therefore, it is favorable for obtain a balance between illuminance and the depth of view.

When half of a maximum field of view of the optical photographing system is HFOV, the following condition can be satisfied: $40.0 [deg.]<HFOV<70.0 [deg.]$. Therefore, it is favorable for featuring the wide field of view of the optical photographing system and preventing aberrations such as distortion due to an overly large field of view. Moreover, the following condition can also be satisfied: $45.0 [deg.]<HFOV<60.0 [deg.]$.

When the maximum effective radius of the object-side surface of the first lens element is Y11, and the maximum image height of the optical photographing system is ImgH, the following condition can be satisfied: $0.70<Y11/ImgH<1.0$. Therefore, it is favorable for adjusting the outer diameter of the lens element and the size of the image surface so as to obtain a balance between the field of view, the size distribution and the size of the image surface.

When a curvature radius of the object-side surface of the fifth lens element is R9, and a curvature radius of the image-side surface of the fifth lens element is R10, the following condition can be satisfied: $0<(R9+R10)/(R9-R10)<0.50$. Therefore, it is favorable for adjusting the lens shape and the refractive power of the fifth lens element so as to reduce the size.

According to the present disclosure, the aforementioned features and conditions can be utilized in numerous combinations so as to achieve corresponding effects.

According to the present disclosure, the lens elements of the optical photographing system can be made of either glass or plastic material. When the lens elements are made of glass material, the refractive power distribution of the optical photographing system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical photographing system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, the image surface of the optical photographing system, based on the corresponding image sensor, can be flat or curved, especially a curved surface being concave facing towards the object side of the optical photographing system.

According to the present disclosure, an image correction unit, such as a field flattener, can be optionally disposed between the lens element closest to the image side of the optical photographing system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 19:
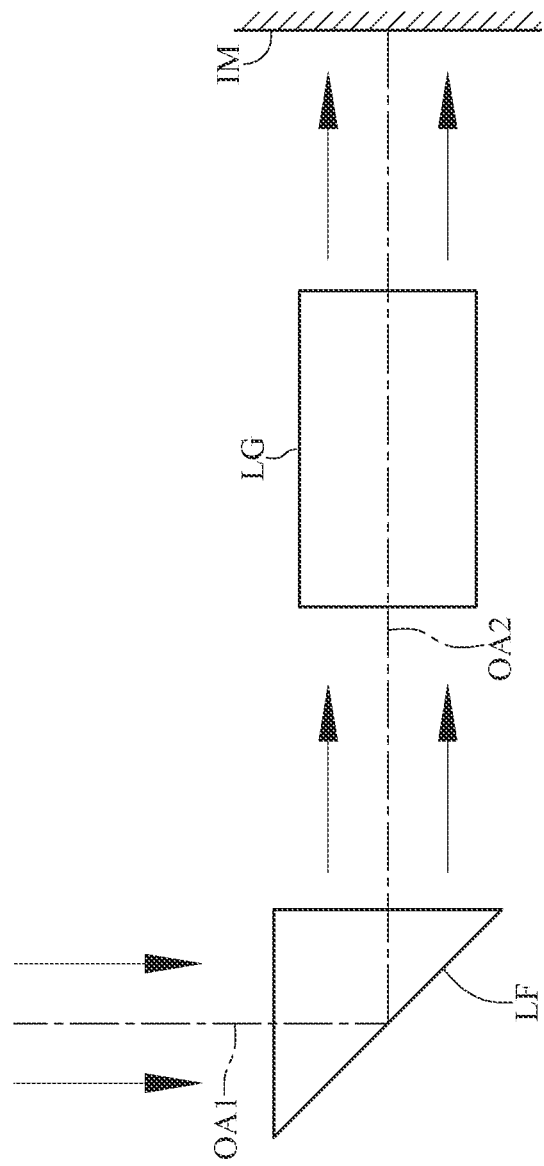
FIG. 19 shows a schematic view of a configuration of a light-folding element in an optical photographing system according to one embodiment of the present disclosure.
Figure 20:
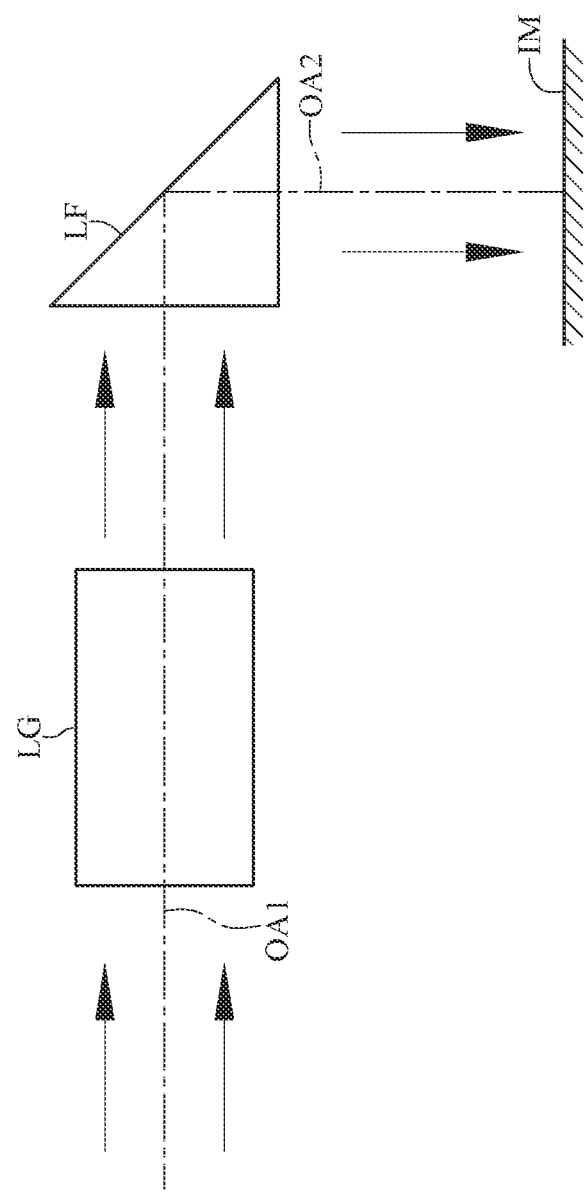
FIG. 20 shows a schematic view of another configuration of a light-folding element in an optical photographing system according to one embodiment of the present disclosure.
Figure 21:
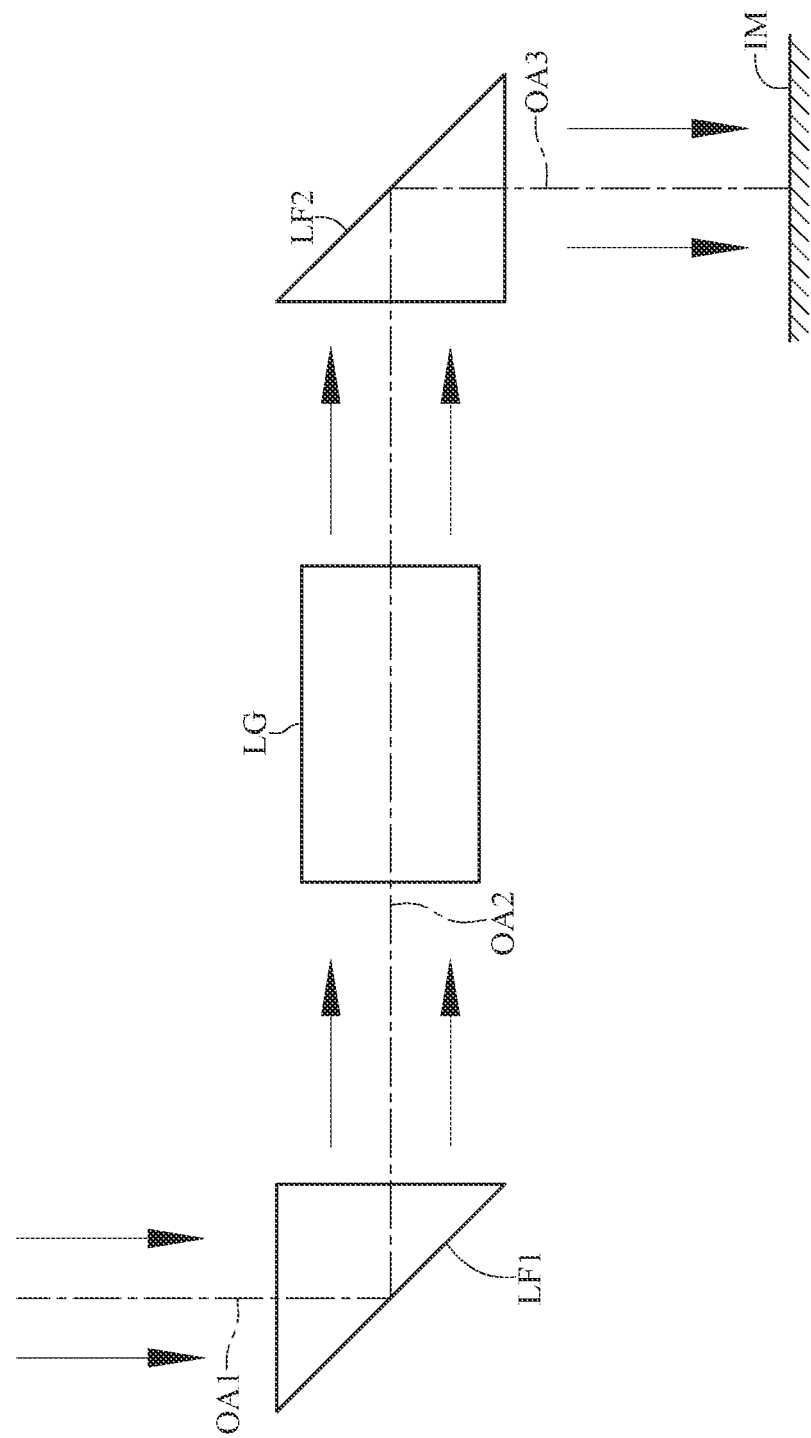
FIG. 21 shows a schematic view of a configuration of two light-folding elements in an optical photographing system according to one embodiment of the present disclosure.

According to the present disclosure, at least one light-folding element, such as a prism or a mirror, can be optionally disposed between an imaged object and the image surface on the imaging optical path, such that the optical photographing system can be more flexible in space arrangement, and therefore the dimensions of an image capturing unit is not restricted by the total track length of the optical photographing system. Specifically, please refer to FIG. 19 and FIG. 20. FIG. 19 shows a schematic view of a configuration of a light-folding element in an optical photographing system according to one embodiment of the present disclosure, and FIG. 20 shows a schematic view of another configuration of a light-folding element in an optical photographing system according to one embodiment of the present disclosure. In FIG. 19 and FIG. 20, the optical photographing system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the optical photographing system as shown in FIG. 19 or disposed between a lens group LG of the optical photographing system and the image surface IM as shown in FIG. 20. Furthermore, please refer to FIG. 21, which shows a schematic view of a configuration of two light-folding elements in an optical photographing system according to one embodiment of the present disclosure. In FIG. 21, the optical photographing system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical photographing system, the second light-folding element LF2 is disposed between the lens group LG of the optical photographing system and the image surface IM, and the travelling direction of light on the first optical axis OA1 can be the same direction as the travelling direction of light on the third optical axis OA3 as shown in FIG. 21. The optical photographing system can be optionally provided with three or more light-folding elements, and the present disclosure is not limited to the type, amount and position of the light-folding elements of the embodiments disclosed in the aforementioned figures.

According to the present disclosure, the optical photographing system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical photographing system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical photographing system and thereby provides a wider field of view for the same.

According to the present disclosure, the optical photographing system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
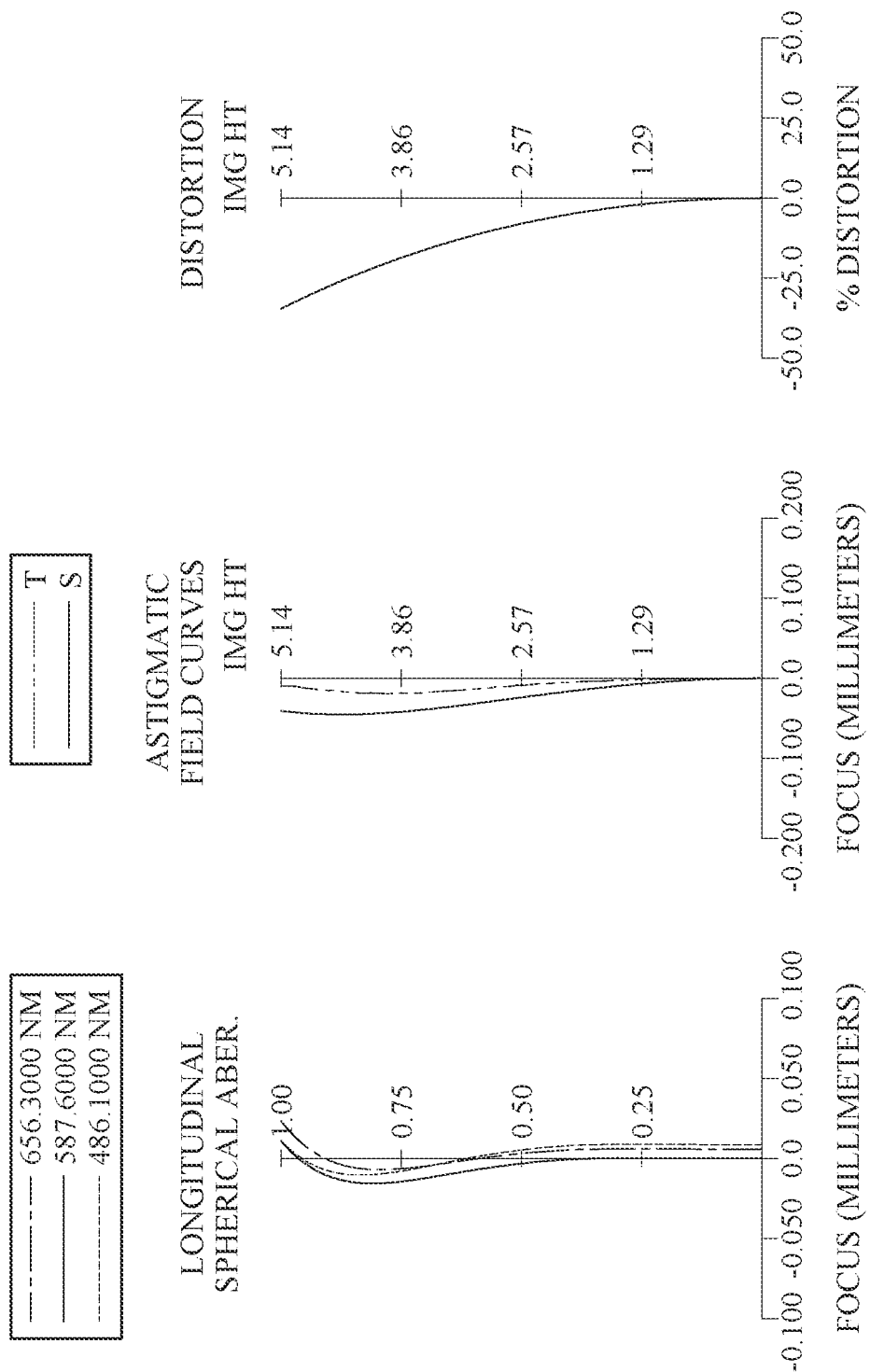
FIG. 2 shows spherical aberration curves, astigmatic field curves and a distortion curve of the image capturing unit according to the 1 st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the optical photographing system (its reference numeral is omitted) of the present disclosure and an image sensor IS. The optical photographing system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, an eighth lens element E8, a filter E9 and an image surface IMG. The optical photographing system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical. The object-side surface of the fourth lens element E4 is cemented to the image-side surface of the third lens element E3.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of glass material and has the object-side surface and the image-side surface being both spherical. The object-side surface of the seventh lens element E7 is cemented to the image-side surface of the sixth lens element E6.

The eighth lens element E8 with positive refractive power has an object-side surface being convex in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the optical photographing system. The image sensor IS is disposed on or near the image surface IMG of the optical photographing system.

The equation of the aspheric surface profiles of the aforementioned lens elements of the 1 st embodiment is expressed as follows:

$$X(Y) = (Y^2/R)/(1 + \text{sqrt}(1 - (1+k) \times (Y/R)^2)) + \sum_i (Ai) \times (Y^i),$$

where,
X is the displacement in parallel with an optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10 and 12.

In the optical photographing system of the image capturing unit according to the 1st embodiment, when a focal length of the optical photographing system is f, an f-number of the optical photographing system is Fno, and half of a maximum field of view of the optical photographing system is HFOV, these parameters have the following values: f=6.04 millimeters (mm), Fno=1.57, HFOV=52.5 degrees (deg.).

When an Abbe number of the first lens element E1 is V1, and a refractive index of the first lens element E1 is N1, the following condition is satisfied: V1/N1=31.41.

When an Abbe number of the fifth lens element E5 is V5, and a refractive index of the fifth lens element E5 is N5, the following condition is satisfied: V5/N5=31.41.

When an Abbe number of the third lens element E3 is V3, and an Abbe number of the fourth lens element E4 is V4, the following condition is satisfied: V4/V3=1.47.

When an Abbe number of the sixth lens element E6 is V6, and an Abbe number of the seventh lens element E7 is V7, the following condition is satisfied: V6/V7=2.13.

When an axial distance between the first lens element E1 and the second lens element E2 is T12, an axial distance between the second lens element E2 and the third lens element E3 is T23, and a central thickness of the second lens element E2 is CT2, the following condition is satisfied: (T12+T23)/CT2=0.68. In this embodiment, an axial distance between two adjacent lens elements is a distance in a paraxial region between two adjacent lens surfaces of the two adjacent lens elements.

When a central thickness of the sixth lens element E6 is CT6, and an axial distance between the fourth lens element E4 and the fifth lens element E5 is T45, the following condition is satisfied: CT6/T45=32.70.

When a maximum value among central thicknesses of all lens elements of the optical photographing system is CTmax, and a maximum value among axial distances between each of all adjacent lens elements of the optical photographing system is ATmax, the following condition is satisfied: CTmax/ATmax=1.83. In this embodiment, among the first through eighth lens elements (E1-E8), a central thickness of the eighth lens element E8 is larger than central thicknesses of the other lens elements of the optical photographing system, and CTmax is equal to the central thickness of the eighth lens element E8. In this embodiment, among the first through eighth lens elements (E1-E8), an axial distance between the seventh lens element E7 and the eighth lens element E8 is larger than the axial distances between all the other two adjacent lens elements of the optical photographing system, and ATmax is equal to the axial distance between the seventh lens element E7 and the eighth lens element E8.

When an axial distance between the aperture stop ST and the image surface IMG is SL, and an axial distance between the object-side surface of the first lens element E1 and the image surface IMG is TL, the following condition is satisfied: SL/TL=0.83.

When an axial distance between the object-side surface of the first lens element E1 and the image-side surface of the eighth lens element E8 is TD, and the axial distance between the second lens element E2 and the third lens element E3 is T23, the following condition is satisfied: TD/T23=66.61.

When the axial distance between the object-side surface of the first lens element E1 and the image surface IMG is TL, and the focal length of the optical photographing system is f, the following condition is satisfied: TL/f=4.93.

When the axial distance between the object-side surface of the first lens element E1 and the image surface IMG is TL, and a maximum image height of the optical photographing system is ImgH, the following condition is satisfied: TL/ImgH=5.79.

When a sum of central thicknesses of all lens elements of the optical photographing system is ΣCT, and a sum of axial distances between each of all adjacent lens elements of the optical photographing system is ΣAT, the following condition is satisfied: ΣCT/ΣAT=4.34. In this embodiment, ΣCT is a sum of central thicknesses of the first lens element E1, the second lens element E2, the third lens element E3, the fourth lens element E4, the fifth lens element E5, the sixth lens element E6, the seventh lens element E7, and the eighth lens element E8. In this embodiment, ΣAT is a sum of axial distances between the first lens element E1 and the second lens element E2, the second lens element E2 and the third lens element E3, the third lens element E3 and the fourth lens element E4, the fourth lens element E4 and the fifth lens element E5, the fifth lens element E5 and the sixth lens element E6, the sixth lens element E6 and the seventh lens element E7, and the seventh lens element E7 and the eighth lens element E8.

When a curvature radius of the object-side surface of the fifth lens element E5 is R9, and a curvature radius of the image-side surface of the fifth lens element E5 is R10, the following condition is satisfied: (R9+R10)/(R9−R10)=0.19.

When a curvature radius of the object-side surface of the first lens element E1 is R1, and a curvature radius of the image-side surface of the first lens element E1 is R2, the following condition is satisfied: R1/R2=8.69.

When the focal length of the optical photographing system is f, and a focal length of the first lens element E1 is f1, the following condition is satisfied: f/f1=−0.69.

When the focal length of the optical photographing system is f, and a focal length of the fifth lens element E5 is f5, the following condition is satisfied: f/f5=0.67.

When the focal length of the optical photographing system is f, and a composite focal length of the third lens element E3 and the fourth lens element E4 is f34, the following condition is satisfied: |f/f34|=0.02.

When the focal length of the optical photographing system is f, and a composite focal length of the sixth lens element E6 and the seventh lens element E7 is f67, the following condition is satisfied: f/f67=−0.42.

When the maximum image height of the optical photographing system is ImgH, and an entrance pupil diameter of the optical photographing system is EPD, the following condition is satisfied: ImgH/EPD=1.34.

When a maximum effective radius of the object-side surface of the first lens element E1 is Y11, and the maximum image height of the optical photographing system is ImgH, the following condition is satisfied: Y11/ImgH=0.89.

When the maximum effective radius of the object-side surface of the first lens element E1 is Y11, and a maximum effective radius of the image-side surface of the fifth lens element E5 is Y52, the following condition is satisfied: Y11/Y52=0.75.

When the maximum effective radius of the object-side surface of the first lens element E1 is Y11, and a maximum effective radius of the image-side surface of the eighth lens element E8 is Y82, the following condition is satisfied: Y11/Y82=0.84.

When a maximum value among maximum effective radii on the object-side surfaces and the image-side surfaces of all lens elements of the optical photographing system is Ymax, and a minimum value among maximum effective radii on the object-side surfaces and the image-side surfaces of all lens elements of the optical photographing system is Ymin, the following condition is satisfied: Ymax/Ymin=2.30. In this embodiment, among the first through eighth lens elements (E1-E8), the maximum effective radius on the image-side surface of the fifth lens element E5 is larger than maximum effective radii on the other surfaces of all lens elements of the optical photographing system, and Ymax is equal to the maximum effective radius of the image-side surface of the fifth lens element E5. In this embodiment, among the first through eighth lens elements (E1-E8), a maximum effective radius on the object-side surface of the third lens element E3 is smaller than maximum effective radii on the other surfaces of all lens elements of the optical photographing system, and Ymin is equal to the maximum effective radius of the object-side surface of the third lens element E3.

The detailed optical data of the 1st embodiment are shown in Table 1 and the aspheric surface data are shown in Table 2 below.

TABLE 1

1st Embodiment
f = 6.04 mm, Fno = 1.57, HFOV = 52.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 46.1884 | (ASP) | 0.700 | Glass | 1.693 | 53.2 | −8.72 |
| 2 | | 5.3131 | (ASP) | 1.604 | | | | |
| 3 | Lens 2 | 155.6026 | (SPH) | 2.949 | Glass | 1.923 | 18.9 | 20.73 |
| 4 | | −21.6124 | (SPH) | −0.089 | | | | |
| 5 | Ape. Stop | Plano | | 0.492 | | | | |
| 6 | Lens 3 | −7.6921 | (SPH) | 1.200 | Glass | 1.834 | 37.2 | −5.73 |
| 7 | | 13.5364 | (SPH) | 0.005 | Cemented | 1.514 | 38.8 | |
| 8 | Lens 4 | 13.5364 | (SPH) | 3.607 | Glass | 1.729 | 54.7 | 7.39 |
| 9 | | −7.9517 | (SPH) | 0.863 | | | | |
| 10 | Stop | Plano | | −0.763 | | | | |
| 11 | Lens 5 | 14.3764 | (ASP) | 4.244 | Glass | 1.693 | 53.2 | 9.01 |
| 12 | | −9.7114 | (ASP) | 0.100 | | | | |
| 13 | Lens 6 | 31.9435 | (SPH) | 3.270 | Glass | 1.729 | 54.7 | 11.13 |
| 14 | | −10.4071 | (SPH) | 0.005 | Cemented | 1.514 | 38.8 | |
| 15 | Lens 7 | −10.4071 | (SPH) | 0.700 | Glass | 1.785 | 25.7 | −5.89 |
| 16 | | 8.5669 | (SPH) | 2.806 | | | | |
| 17 | Lens 8 | 10.8846 | (SPH) | 5.149 | Glass | 1.729 | 54.7 | 17.16 |
| 18 | | 67.0942 | (SPH) | 1.500 | | | | |
| 19 | Filter | Plano | | 0.900 | Glass | 1.517 | 64.2 | — |
| 20 | | Plano | | 0.536 | | | | |
| 21 | Image | Plano | | — | | | | |

Note:
Reference wavelength is 587.6 nm (d-line).
An effective radius of the stop S1 (Surface 10) is 5.763 mm.

TABLE 2

Aspheric Coefficients

| | Surface # | | | |
|---|---|---|---|---|
| | 1 | 2 | 11 | 12 |
| k = | −1.87029E+01 | −1.05920E+00 | 1.79495E+00 | 1.68125E−01 |
| A4 = | 1.95341E−03 | 3.76529E−03 | −3.00656E−04 | 1.73935E−04 |
| A6 = | −1.56216E−04 | −1.80436E−06 | 2.48135E−06 | 1.03669E−06 |
| A8 = | 7.99575E−06 | −8.39719E−06 | −1.14612E−07 | 5.79044E−08 |
| A10 = | −1.97156E−07 | 1.27215E−06 | 2.64634E−09 | −2.28915E−09 |
| A12 = | 1.67758E−09 | 1.10073E−08 | −1.19775E−11 | 5.09656E−11 |

In Table 1, the curvature radius, the thickness and the focal length are shown in millimeters (mm). Surface numbers 0-21 represent the surfaces sequentially arranged from the object side to the image side along the optical axis. In Table 2, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
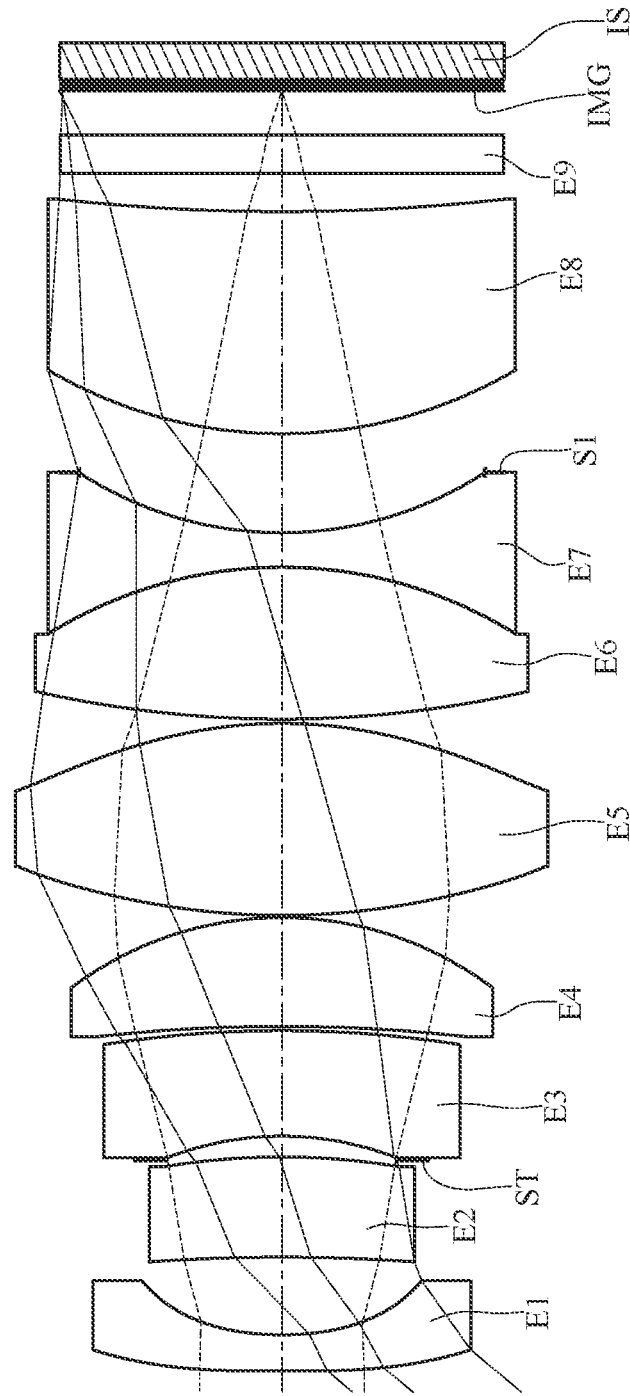
FIG. 3 is a schematic view of an image capturing unit according to the 2nd embodiment of the present disclosure.
Figure 4:
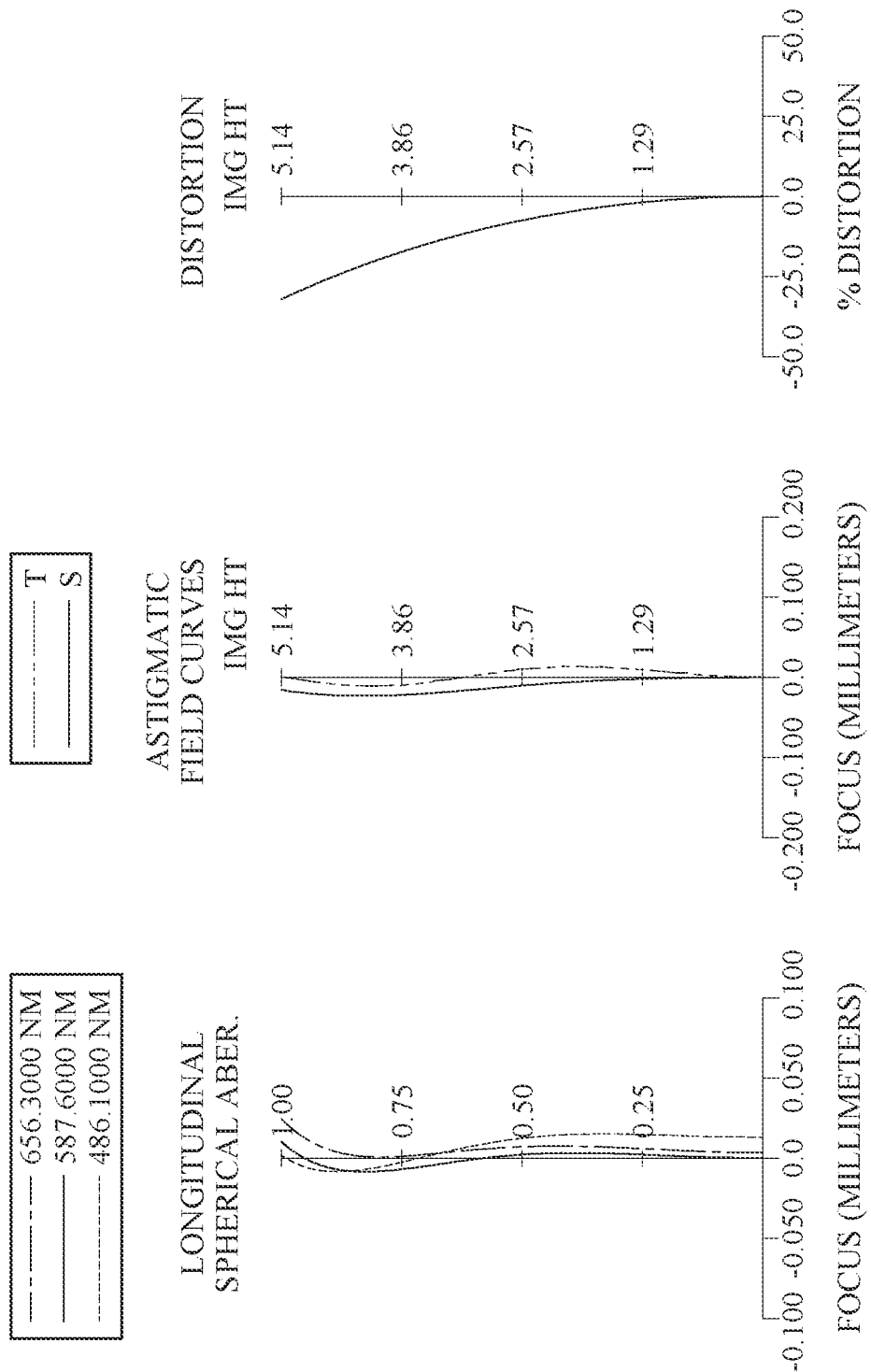
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the optical photographing system (its reference numeral is omitted) of the present disclosure and an image sensor IS. The optical photographing system includes, in order from an object side to an image side along an optical axis, a first lens element E1, a second lens element E2, an aperture stop ST, a third lens element E3, a fourth lens element E4, a fifth lens element E5, a sixth lens element E6, a seventh lens element E7, a stop S1, an eighth lens element E8, a filter E9 and an image surface IMG. The optical photographing system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both spherical.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of glass material and has the object-side surface and the image-side surface being both spherical. The object-side surface of the seventh lens element E7 is cemented to the image-side surface of the sixth lens element E6.

The eighth lens element E8 with positive refractive power has an object-side surface being convex in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the optical photographing system. The image sensor IS is disposed on or near the image surface IMG of the optical photographing system.

The detailed optical data of the 2nd embodiment are shown in Table 3 and the aspheric surface data are shown in Table 4 below.

TABLE 3

2nd Embodiment
f = 6.32 mm, Fno = 1.64, HFOV = 50.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 200.0000 | (ASP) | 0.850 | Glass | 1.806 | 40.7 | −9.24 |
| 2 | | 7.1677 | (ASP) | 1.820 | | | | |
| 3 | Lens 2 | −42.8162 | (SPH) | 2.350 | Glass | 1.923 | 18.9 | 28.08 |
| 4 | | −16.5684 | (SPH) | −0.080 | | | | |
| 5 | Ape. Stop | Plano | | 0.570 | | | | |
| 6 | Lens 3 | −7.2972 | (SPH) | 2.470 | Glass | 1.603 | 38.0 | −17.49 |
| 7 | | −26.6754 | (SPH) | 0.100 | | | | |
| 8 | Lens 4 | −38.7315 | (SPH) | 2.550 | Glass | 1.618 | 63.4 | 16.32 |
| 9 | | −8.2035 | (SPH) | 0.050 | | | | |
| 10 | Lens 5 | 16.1985 | (ASP) | 4.500 | Glass | 1.693 | 53.2 | 10.07 |
| 11 | | −10.8773 | (ASP) | 0.100 | | | | |
| 12 | Lens 6 | 25.9554 | (SPH) | 3.560 | Glass | 1.804 | 46.6 | 9.61 |
| 13 | | −10.3359 | (SPH) | 0.005 | Cemented | 1.514 | 38.8 | |
| 14 | Lens 7 | −10.3359 | (SPH) | 0.800 | Glass | 1.847 | 23.8 | −5.48 |
| 15 | | 8.7044 | (SPH) | 1.418 | | | | |
| 16 | Stop | Plano | | 0.902 | | | | |
| 17 | Lens 8 | 10.7647 | (SPH) | 5.210 | Glass | 1.620 | 60.4 | 21.33 |
| 18 | | 46.9723 | (SPH) | 0.900 | | | | |
| 19 | Filter | Plano | | 0.900 | Glass | 1.517 | 64.2 | — |
| 20 | | Plano | | 1.024 | | | | |
| 21 | Image | Plano | | — | | | | |

Note:
Reference wavelength is 587.6 nm (d-line).
An effective radius of the stop S1 (Surface 16) is 4.760 mm.

TABLE 4

Aspheric Coefficients

| Surface # | | | | |
|---|---|---|---|---|
| | 1 | 2 | 10 | 11 |
| k = | 3.41416E+01 | −5.43988E−02 | 2.59819E−01 | 2.78237E−04 |
| A4 = | 2.93159E−03 | 4.36817E−03 | −1.50282E−04 | 1.60479E−04 |
| A6 = | −2.15409E−04 | −1.64784E−04 | 2.16338E−06 | 9.37430E−07 |
| A8 = | 1.15875E−05 | 1.20697E−05 | −4.52765E−08 | 2.08952E−08 |
| A10 = | −3.57156E−07 | −2.48830E−07 | 1.46568E−09 | −5.24604E−10 |
| A12 = | 4.76082E−09 | 3.43113E−08 | −4.88155E−12 | 2.15245E−11 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.32 | TL/ImgH | 5.83 |
| Fno | 1.64 | ΣCT/ΣAT | 4.56 |
| HFOV [deg.] | 50.2 | (R9 + R10)/(R9 − R10) | 0.20 |
| V1/N1 | 22.55 | R1/R2 | 27.90 |
| V5/N5 | 31.41 | f/f1 | −0.68 |
| V4/V3 | 1.67 | f/f5 | 0.63 |
| V6/V7 | 1.96 | f/f34 | 0.12 |
| (T12 + T23)/CT2 | 0.98 | f/f67 | −0.40 |
| CT6/T45 | 71.20 | ImgH/EPD | 1.34 |
| CTmax/ATmax | 2.25 | Y11/ImgH | 0.86 |
| SL/TL | 0.84 | Y11/Y52 | 0.71 |
| TD/T23 | 55.46 | Y11/Y82 | 0.85 |
| TL/f | 4.75 | Ymax/Ymin | 2.31 |

3rd Embodiment

Figure 5:
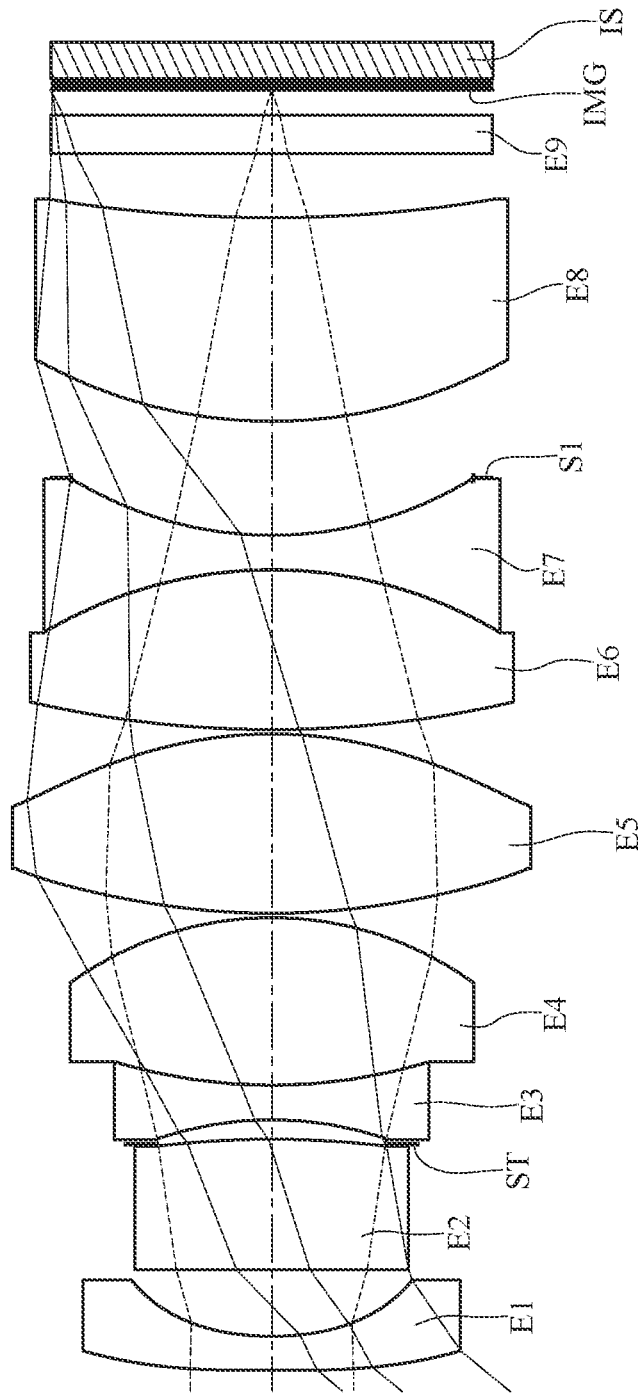
FIG. 5 is a schematic view of an image capturing unit according to the 3rd embodiment of the present disclosure.
Figure 6:
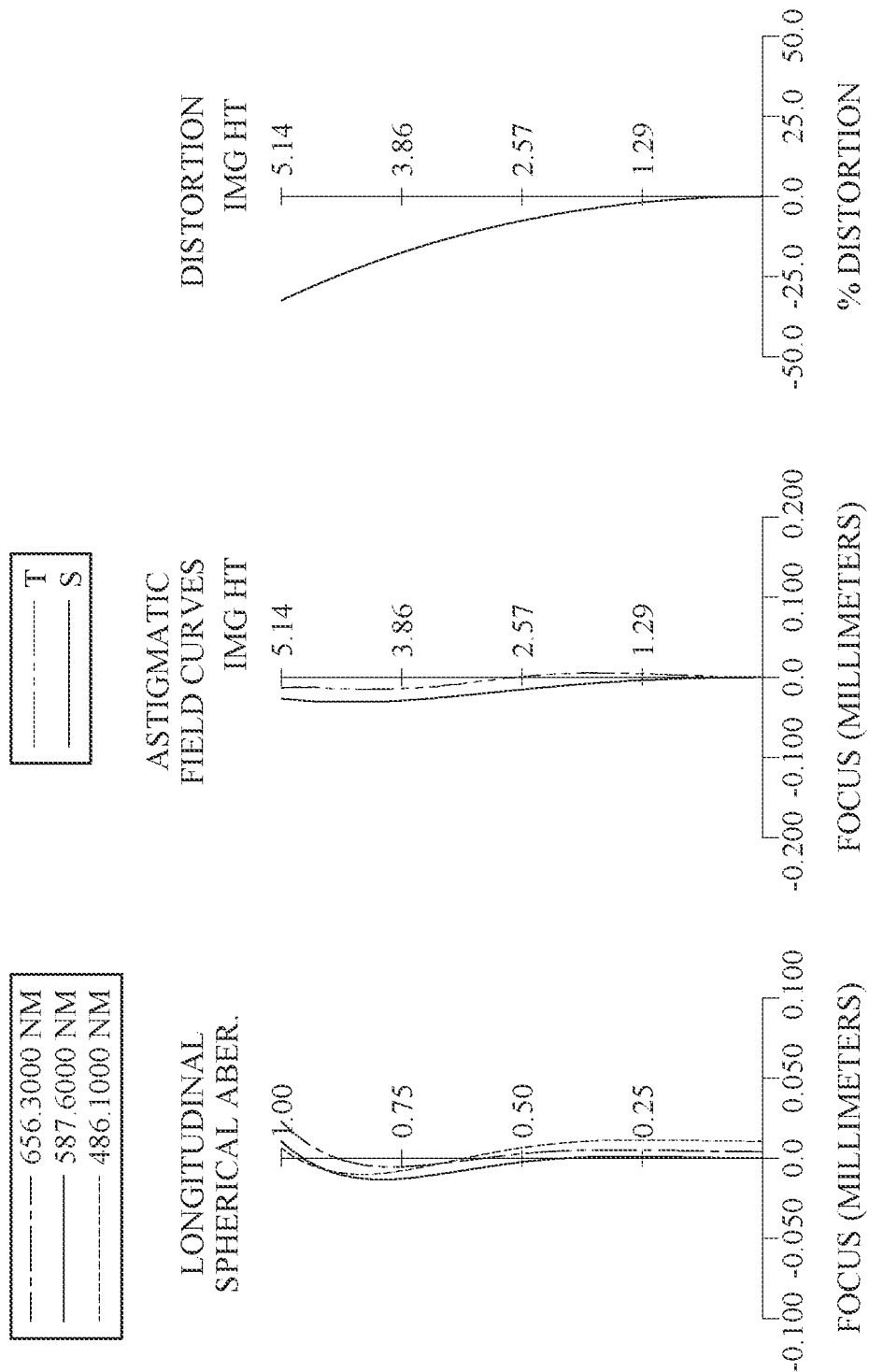
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the optical photographing system (its reference numeral is omitted) of the present disclosure and an image sensor IS. The optical photographing system includes, in order from an object side to an image side along an optical axis, a first lens element E1, a second lens element E2, an aperture stop ST, a third lens element E3, a fourth lens element E4, a fifth lens element E5, a sixth lens element E6, a seventh lens element E7, a stop S1, an eighth lens element E8, a filter E9 and an image surface IMG. The optical photographing system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being planar in a paraxial region thereof and an image-side surface being convex in a paraxial region thereof. The second lens element E2 is made of glass material and has the image-side surface being spherical.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical. The object-side surface of the fourth lens element E4 is cemented to the image-side surface of the third lens element E3.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of glass material and has the object-side surface and the image-side surface being both spherical. The object-side surface of the seventh lens element E7 is cemented to the image-side surface of the sixth lens element E6.

The eighth lens element E8 with positive refractive power has an object-side surface being convex in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the optical photographing system. The image sensor IS is disposed on or near the image surface IMG of the optical photographing system.

The detailed optical data of the 3rd embodiment are shown in Table 5 and the aspheric surface data are shown in Table 6 below.

TABLE 5

3rd Embodiment
f = 6.27 mm, Fno = 1.64, HFOV = 50.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 200.0000 | (ASP) | 0.800 | Glass | 1.806 | 40.7 | −8.74 |
| 2 |  | 6.7897 | (ASP) | 1.563 |  |  |  |  |
| 3 | Lens 2 | Plano |  | 3.055 | Glass | 1.923 | 18.9 | 24.44 |
| 4 |  | −22.5570 | (SPH) | −0.110 |  |  |  |  |
| 5 | Ape. Stop | Plano |  | 0.569 |  |  |  |  |
| 6 | Lens 3 | −8.1950 | (SPH) | 0.800 | Glass | 1.667 | 48.4 | −7.31 |
| 7 |  | 12.5106 | (SPH) | 0.005 | Cemented | 1.514 | 38.8 |  |
| 8 | Lens 4 | 12.5106 | (SPH) | 3.932 | Glass | 1.618 | 63.4 | 8.55 |
| 9 |  | −8.0436 | (SPH) | 0.100 |  |  |  |  |
| 10 | Lens 5 | 16.4748 | (ASP) | 4.205 | Glass | 1.693 | 53.2 | 9.60 |
| 11 |  | −10.0105 | (ASP) | 0.100 |  |  |  |  |
| 12 | Lens 6 | 24.9928 | (SPH) | 3.744 | Glass | 1.804 | 46.6 | 9.60 |
| 13 |  | −10.4251 | (SPH) | 0.005 | Cemented | 1.514 | 38.8 |  |
| 14 | Lens 7 | −10.4251 | (SPH) | 0.800 | Glass | 1.847 | 23.8 | −5.59 |
| 15 |  | 8.9635 | (SPH) | 1.341 |  |  |  |  |
| 16 | Stop | Plano |  | 1.333 |  |  |  |  |
| 17 | Lens 8 | 11.2290 | (SPH) | 4.778 | Glass | 1.729 | 54.7 | 21.68 |
| 18 |  | 31.8085 | (SPH) | 1.500 |  |  |  |  |
| 19 | Filter | Plano |  | 0.900 | Glass | 1.517 | 64.2 | — |
| 20 |  | Plano |  | 0.580 |  |  |  |  |
| 21 | Image | Plano |  | — |  |  |  |  |

Note:
Reference wavelength is 587.6 nm (d-line).
An effective radius of the stop S1 (Surface 16) is 4.714 mm.

TABLE 6

Aspheric Coefficients

| Surface # | | | | |
|---|---|---|---|---|
| | 1 | 2 | 10 | 11 |
| k = | −9.80000E+01 | −3.52359E−01 | 4.18821E−01 | −6.01144E−01 |
| A4 = | 2.91780E−03 | 4.40173E−03 | −1.88906E−04 | 6.12640E−05 |
| A6 = | −2.30325E−04 | −1.48213E−04 | 3.69655E−06 | 1.19320E−06 |
| A8 = | 1.25697E−05 | 5.25153E−06 | −1.54989E−07 | 5.64151E−09 |
| A10 = | −3.81169E−07 | 5.43564E−07 | 5.10461E−09 | −1.09406E−09 |
| A12 = | 4.83749E−09 | 1.42392E−09 | −3.47726E−11 | 5.09945E−11 |

In the 3rd embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.27 | TL/ImgH | 5.83 |
| Fno | 1.64 | ΣCT/ΣAT | 4.51 |
| HFOV [deg.] | 50.5 | (R9 + R10)/(R9 − R10) | 0.24 |
| V1/N1 | 22.55 | R1/R2 | 29.46 |
| V5/N5 | 31.41 | f/f1 | −0.72 |
| V4/V3 | 1.31 | f/f5 | 0.65 |
| V6/V7 | 1.96 | f/f34 | 0.07 |
| (T12 + T23)/CT2 | 0.66 | f/f67 | −0.37 |
| CT6/T45 | 37.44 | ImgH/EPD | 1.34 |
| CTmax/ATmax | 1.79 | Y11/ImgH | 0.86 |
| SL/TL | 0.82 | Y11/Y52 | 0.73 |
| TD/T23 | 58.87 | Y11/Y82 | 0.85 |
| TL/f | 4.78 | Ymax/Ymin | 2.26 |

4th Embodiment

Figure 7:
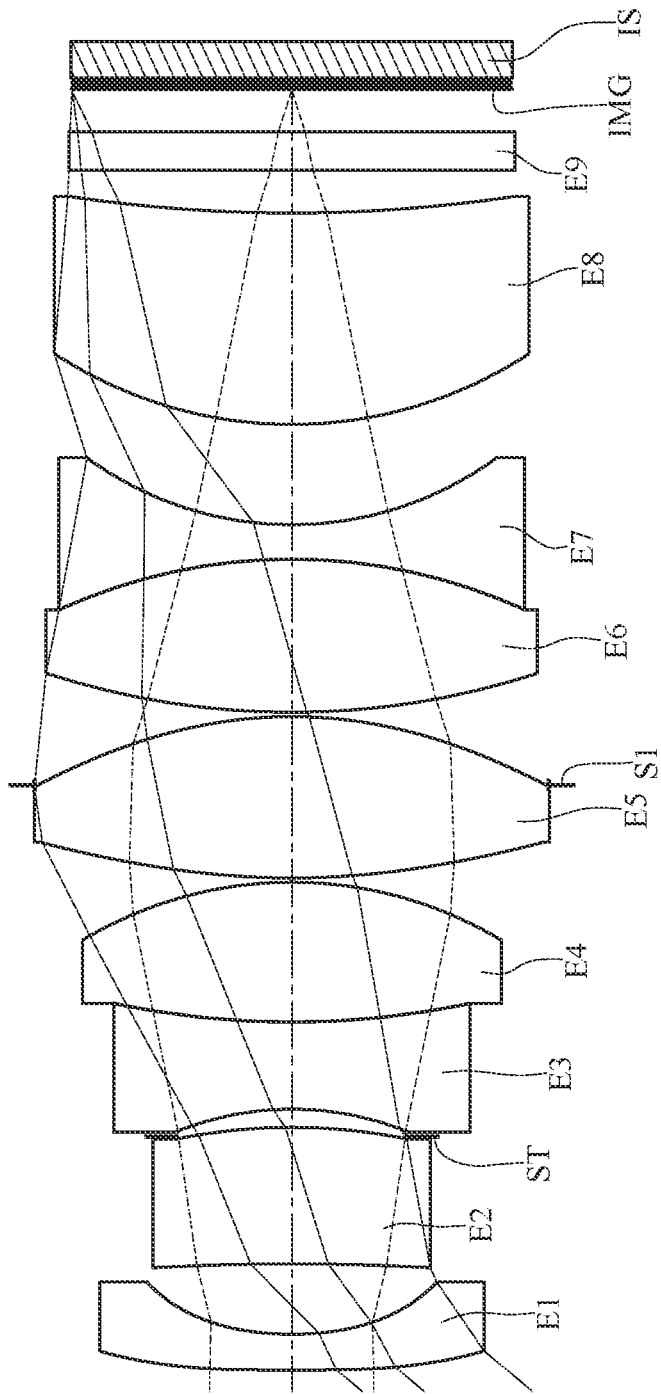
FIG. 7 is a schematic view of an image capturing unit according to the 4th embodiment of the present disclosure.
Figure 8:
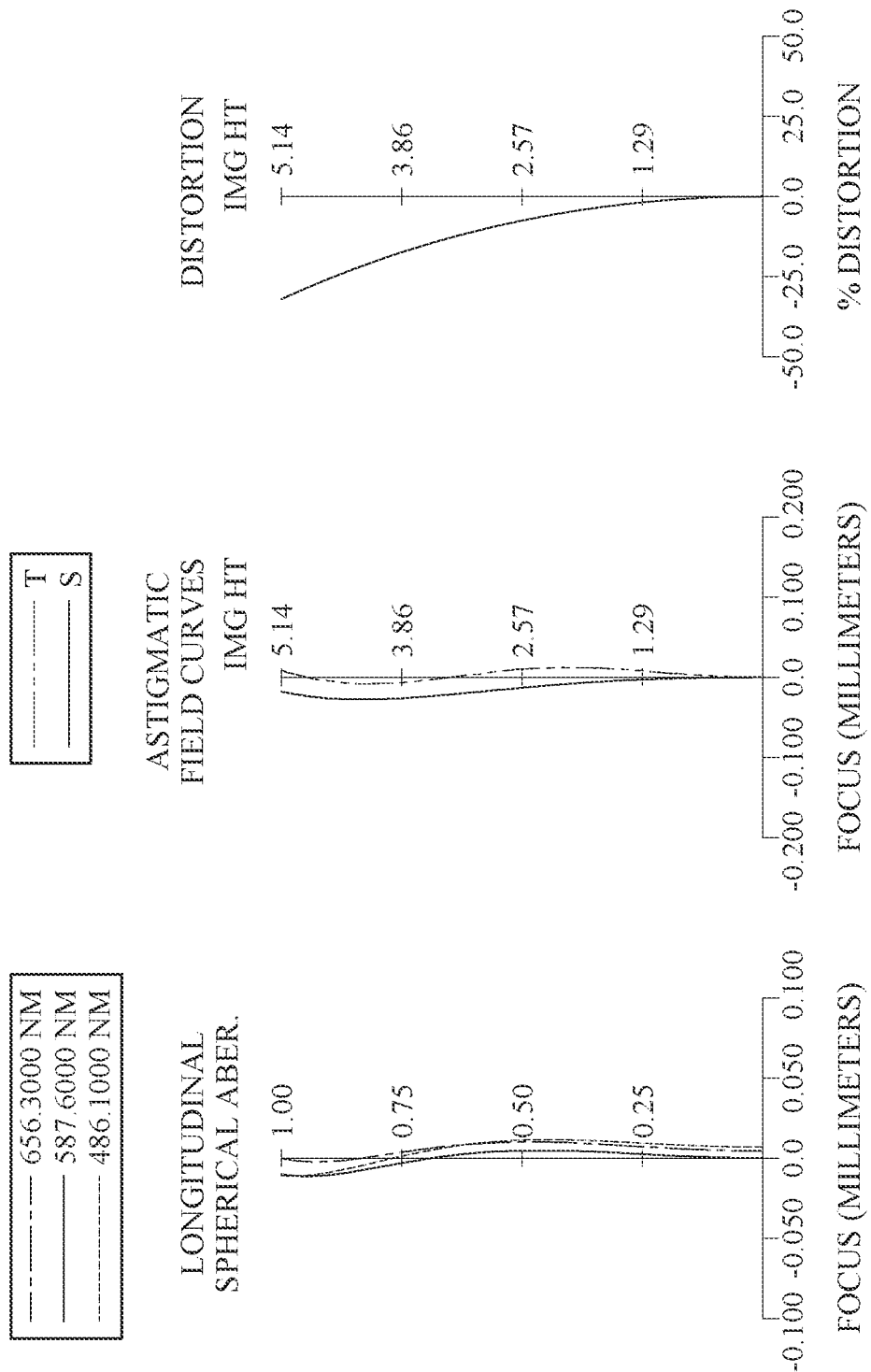
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the optical photographing system (its reference numeral is omitted) of the present disclosure and an image sensor IS. The optical photographing system includes, in order from an object side to an image side along an optical axis, a first lens element E1, a second lens element E2, an aperture stop ST, a third lens element E3, a fourth lens element E4, a fifth lens element E5, a stop S1, a sixth lens element E6, a seventh lens element E7, an eighth lens element E8, a filter E9 and an image surface IMG. The optical photographing system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical. The object-side surface of the fourth lens element E4 is cemented to the image-side surface of the third lens element E3.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of glass material and has the object-side surface and the image-side surface being both spherical. The object-side surface of the seventh lens element E7 is cemented to the image-side surface of the sixth lens element E6.

The eighth lens element E8 with positive refractive power has an object-side surface being convex in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface MG, and will not affect the focal length of the optical photographing system. The image sensor IS is disposed on or near the image surface IMG of the optical photographing system.

The detailed optical data of the 4th embodiment are shown in Table 7 and the aspheric surface data are shown in Table 8 below.

TABLE 7

4th Embodiment
f = 6.31 mm, Fno = 1.64, HFOV=50.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 250.0000 | (ASP) | 0.840 | Glass | 1.806 | 40.7 | −9.66 |
| 2 | | 7.5430 | (ASP) | 1.650 | | | | |
| 3 | Lens 2 | −57.1822 | (SPH) | 3.200 | Glass | 1.923 | 18.9 | 18.26 |
| 4 | | −13.3680 | (SPH) | −0.220 | | | | |
| 5 | Ape. Stop | Plano | | 0.650 | | | | |
| 6 | Lens 3 | −7.0921 | (SPH) | 2.030 | Glass | 1.603 | 38.0 | −8.43 |
| 7 | | 19.8955 | (SPH) | 0.005 | Cemented | 1.514 | 38.8 | |
| 8 | Lens 4 | 19.8955 | (SPH) | 3.280 | Glass | 1.618 | 63.4 | 10.89 |
| 9 | | −9.5238 | (SPH) | 0.100 | | | | |
| 10 | Lens 5 | 18.4636 | (ASP) | 3.780 | Glass | 1.693 | 53.2 | 10.35 |
| 11 | | −10.7511 | (ASP) | −1.610 | | | | |
| 12 | Stop | Plano | | 1.710 | | | | |
| 13 | Lens 6 | 18.4996 | (SPH) | 3.590 | Glass | 1.804 | 46.6 | 10.05 |
| 14 | | −13.0942 | (SPH) | 0.005 | Cemented | 1.514 | 38.8 | |
| 15 | Lens 7 | −13.0942 | (SPH) | 0.800 | Glass | 1.847 | 23.8 | −5.82 |
| 16 | | 8.1141 | (SPH) | 2.350 | | | | |
| 17 | Lens 8 | 10.1221 | (SPH) | 4.960 | Glass | 1.623 | 58.2 | 21.19 |
| 18 | | 35.2344 | (SPH) | 1.000 | | | | |
| 19 | Filter | Plano | | 0.900 | Glass | 1.517 | 64.2 | — |
| 20 | | Plano | | 0.992 | | | | |
| 21 | Image | Plano | | — | | | | |

Note:
Reference wavelength is 587.6 nm (d-line).
An effective radius of the stop S1 (Surface 12) is 6.025 mm.

TABLE 8

Aspheric Coefficients

| | Surface # | | | |
|---|---|---|---|---|
| | 1 | 2 | 10 | 11 |
| k = | −2.75378E+01 | −1.33248E+00 | 3.23352E+00 | 5.46766E−01 |
| A4 = | 2.38049E−03 | 3.85068E−03 | −2.10264E−04 | 1.74738E−04 |
| A6 = | −1.63344E−04 | −1.09874E−04 | 1.27798E−06 | 8.84185E−07 |
| A8 = | 8.06003E−06 | 3.29451E−06 | −4.58634E−08 | 5.11059E−08 |
| A10 = | −2.17012E−07 | 3.95004E−07 | 6.41195E−10 | −1.49236E−09 |
| A12 = | 2.47156E−09 | −3.96315E−09 | 5.01217E−13 | 2.57862E−11 |

In the 4th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.31 | TL/ImgH | 5.84 |
| Fno | 1.64 | ΣCT/ΣAT | 4.84 |
| HFOV [deg.] | 50.2 | (R9 + R10)/(R9 − R10) | 0.26 |
| V1/N1 | 22.55 | R1/R2 | 33.14 |
| V5/N5 | 31.41 | f/f1 | −0.65 |
| V4/V3 | 1.67 | f/f5 | 0.61 |
| V6/V7 | 1.96 | f/f34 | 0.01 |
| (T12 + T23)/CT2 | 0.65 | f/f67 | −0.33 |
| CT6/T45 | 35.90 | ImgH/EPD | 1.34 |
| CTmax/ATmax | 2.11 | Y11/ImgH | 0.88 |
| SL/TL | 0.82 | Y11/Y52 | 0.75 |

-continued

| 4th Embodiment | | | |
|---|---|---|---|
| TD/T23 | 63.07 | Y11/Y82 | 0.86 |
| TL/f | 4.76 | Ymax/Ymin | 2.24 |

5th Embodiment

Figure 9:
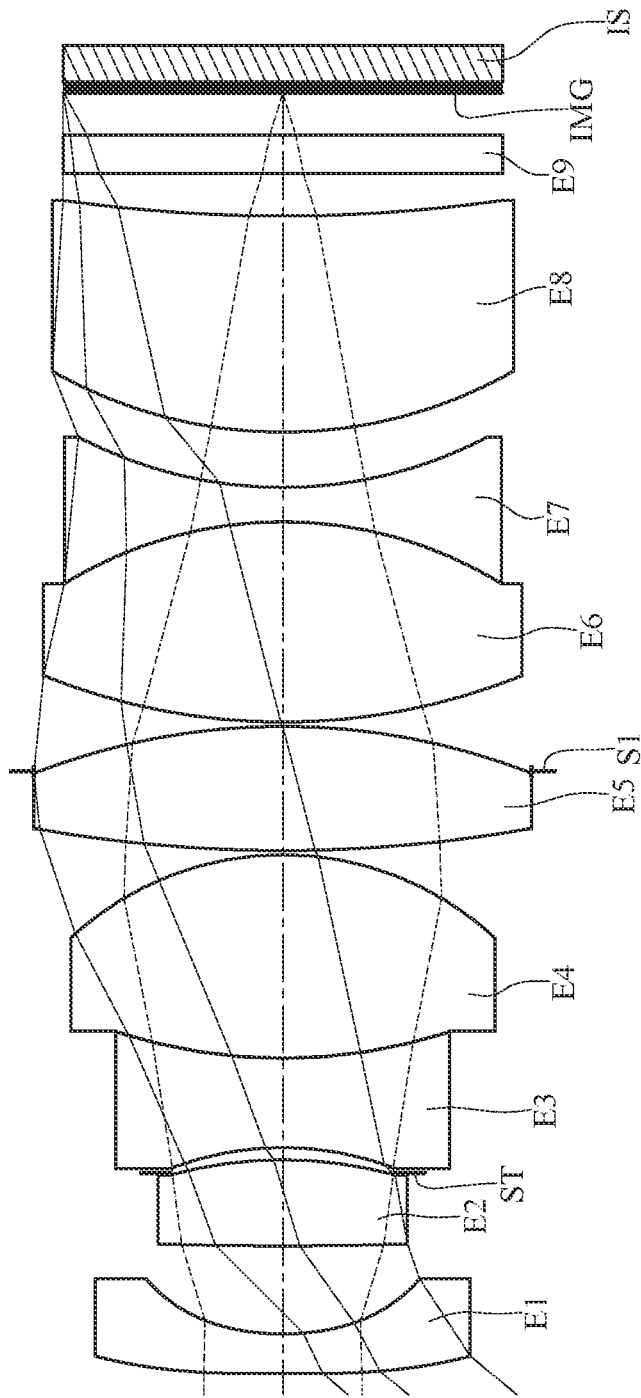
FIG. 9 is a schematic view of an image capturing unit according to the 5th embodiment of the present disclosure.
Figure 10:
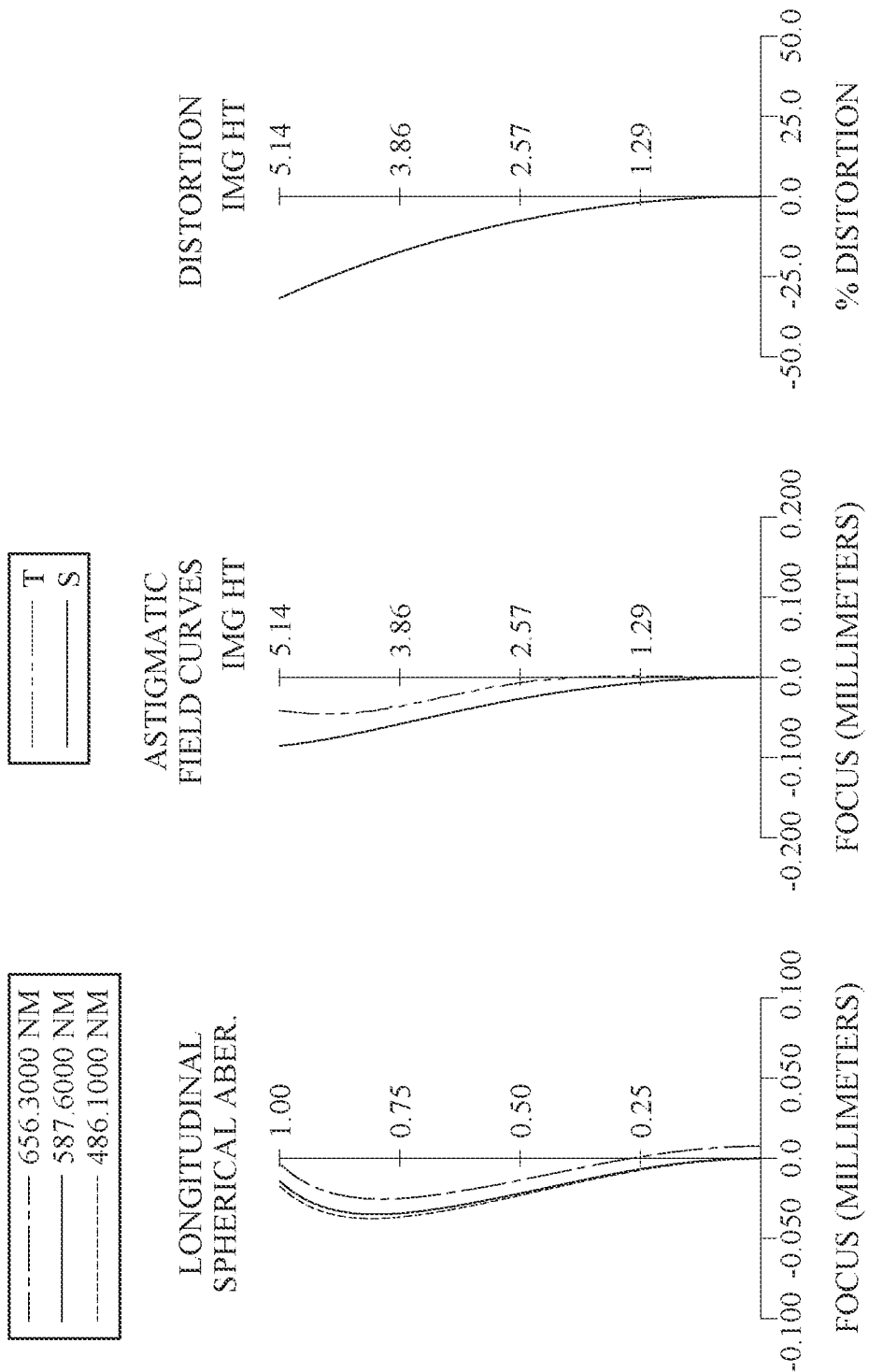
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the optical photographing system (its reference numeral is omitted) of the present disclosure and an image sensor IS. The optical photographing system includes, in order from an object side to an image side along an optical axis, a first lens element E1, a second lens element E2, an aperture stop ST, a third lens element E3, a fourth lens element E4, a fifth lens element E5, a stop S1, a sixth lens element E6, a seventh lens element E7, an eighth lens element E8, a filter E9 and an image surface IMG. The optical photographing system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical. The object-side surface of the fourth lens element E4 is cemented to the image-side surface of the third lens element E3.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of glass material and has the object-side surface and the image-side surface being both spherical. The object-side surface of the seventh lens element E7 is cemented to the image-side surface of the sixth lens element E6.

The eighth lens element E8 with positive refractive power has an object-side surface being convex in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the optical photographing system. The image sensor IS is disposed on or near the image surface IMG of the optical photographing system.

The detailed optical data of the 5th embodiment are shown in Table 9 and the aspheric surface data are shown in Table 10 below.

TABLE 9

5th Embodiment
f = 6.26 mm, Fno = 1.69, HFOV = 50.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 250.0000 | (ASP) | 0.933 | Glass | 1.806 | 40.7 | −7.84 |
| 2 | | 6.1539 | (ASP) | 2.060 | | | | |
| 3 | Lens 2 | 89.0586 | (SPH) | 2.021 | Glass | 2.001 | 25.4 | 8.90 |
| 4 | | −9.7880 | (SPH) | −0.319 | | | | |
| 5 | Ape. Stop | Plano | | 0.610 | | | | |
| 6 | Lens 3 | −7.2315 | (SPH) | 2.083 | Glass | 1.749 | 35.0 | −5.84 |
| 7 | | 12.4580 | (SPH) | 0.005 | Cemented | 1.514 | 38.8 | |
| 8 | Lens 4 | 12.4580 | (SPH) | 4.770 | Glass | 1.613 | 58.6 | 8.27 |
| 9 | | −7.2968 | (SPH) | 0.100 | | | | |
| 10 | Lens 5 | 32.9179 | (SPH) | 2.908 | Glass | 1.729 | 54.7 | 15.12 |
| 11 | | −15.9672 | (SPH) | −1.054 | | | | |
| 12 | Stop | Plano | | 1.154 | | | | |
| 13 | Lens 6 | 14.9149 | (SPH) | 4.697 | Glass | 1.729 | 54.7 | 8.80 |
| 14 | | −9.7571 | (SPH) | 0.005 | Cemented | 1.514 | 38.8 | |
| 15 | Lens 7 | −9.7571 | (SPH) | 0.800 | Glass | 2.001 | 25.4 | −4.90 |
| 16 | | 10.2765 | (SPH) | 1.294 | | | | |
| 17 | Lens 8 | 10.8936 | (SPH) | 5.070 | Glass | 1.772 | 49.6 | 18.55 |
| 18 | | 36.2421 | (SPH) | 1.000 | | | | |
| 19 | Filter | Plano | | 0.900 | Glass | 1.517 | 64.2 | — |
| 20 | | Plano | | 0.963 | | | | |
| 21 | Image | Plano | | — | | | | |

Note:
Reference wavelength is 587.6 nm (d-line).
An effective radius of the stop S1 (Surface 12) is 5.825 mm.

TABLE 10

Aspheric Coefficients

| | Surface # | |
|---|---|---|
| | 1 | 2 |
| k = | −9.90000E+01 | −8.93978E−01 |
| A4 = | 2.54279E−03 | 4.33880E−03 |

TABLE 10-continued

Aspheric Coefficients

| | Surface # | |
|---|---|---|
| | 1 | 2 |
| A6 = | −1.75851E−04 | −5.37005E−05 |
| A8 = | 7.95400E−06 | −7.50590E−06 |
| A10 = | −1.81525E−07 | 1.71748E−06 |
| A12 = | 1.39344E−09 | −4.93481E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.26 | ΣCT/ΣAT | 6.04 |
| Fno | 1.69 | (R9 + R10)/(R9 − R10) | 0.35 |
| HFOV [deg.] | 50.3 | R1/R2 | 40.62 |
| V1/N1 | 22.55 | f/f1 | −0.80 |
| V4/V3 | 1.67 | f/f5 | 0.41 |
| V6/V7 | 2.15 | f/f34 | 0.05 |
| (T12 + T23)/CT2 | 1.16 | f/f67 | −0.37 |
| CT6/T45 | 46.97 | ImgH/EPD | 1.39 |
| CTmax/ATmax | 2.46 | Y11/ImgH | 0.85 |
| SL/TL | 0.84 | Y11/Y52 | 0.75 |
| TD/T23 | 93.25 | Y11/Y82 | 0.85 |
| TL/f | 4.79 | Ymax/Ymin | 2.22 |
| TL/ImgH | 5.83 | — | — |

6th Embodiment

Figure 11:
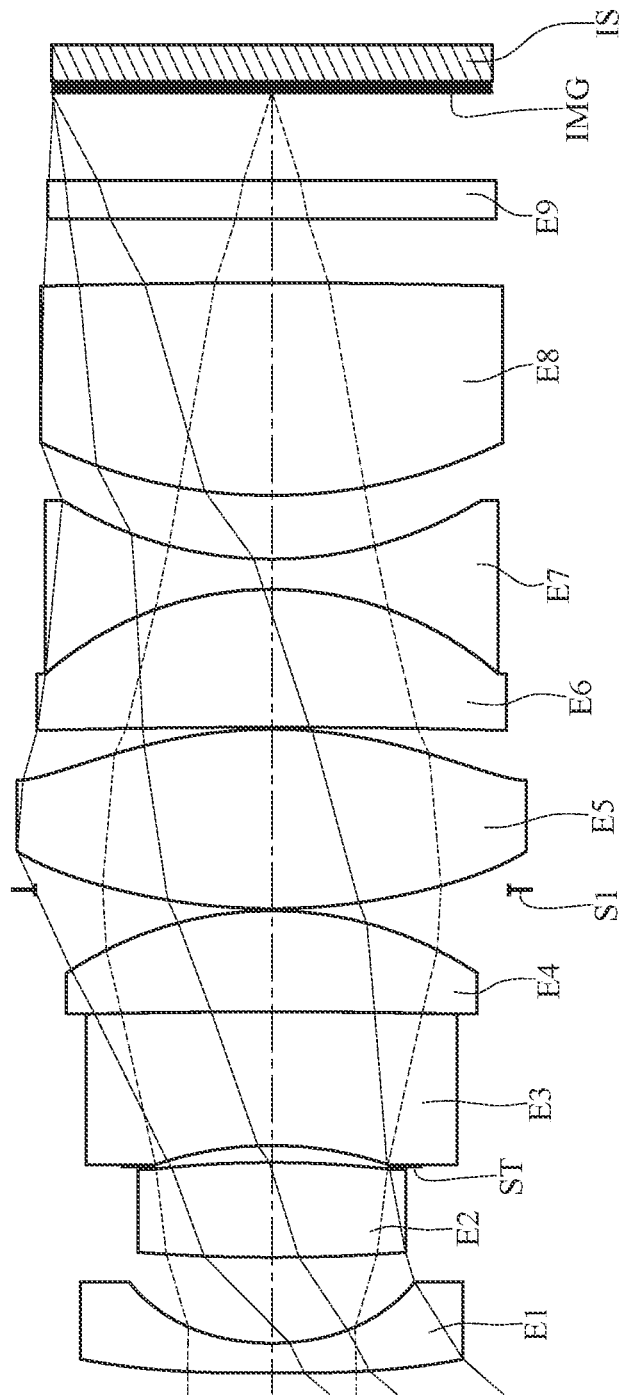
FIG. 11 is a schematic view of an image capturing unit according to the 6th embodiment of the present disclosure.
Figure 12:
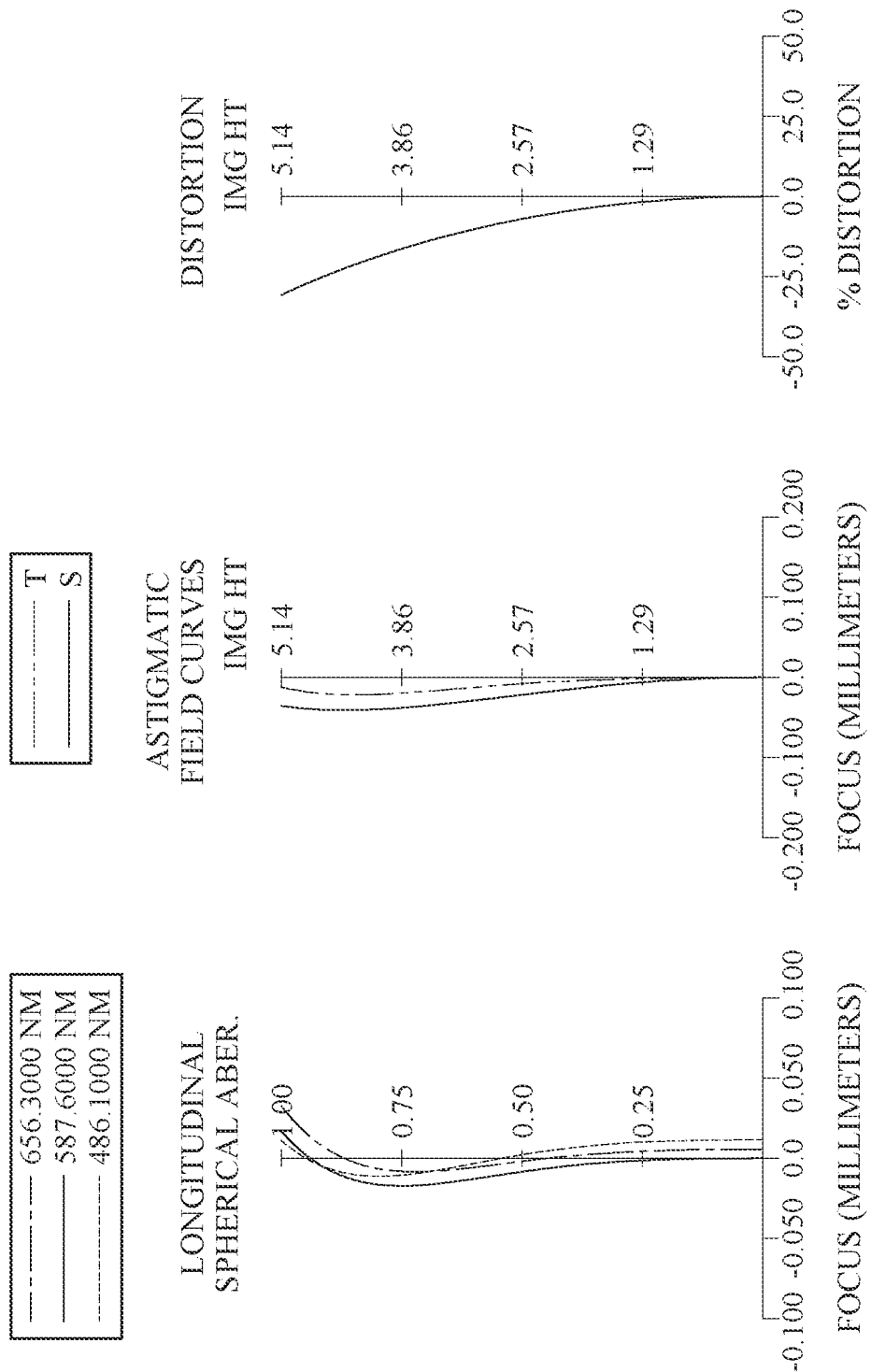
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the optical photographing system (its reference numeral is omitted) of the present disclosure and an image sensor IS. The optical photographing system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, an eighth lens element E8, a filter E9 and an image surface IMG. The optical photographing system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both spherical. The object-side surface of the fourth lens element E4 is cemented to the image-side surface of the third lens element E3.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of glass material and has the object-side surface and the image-side surface being both spherical. The object-side surface of the seventh lens element E7 is cemented to the image-side surface of the sixth lens element E6.

The eighth lens element E8 with positive refractive power has an object-side surface being convex in a paraxial region thereof and an image-side surface being convex in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the optical photographing system. The image sensor IS is disposed on or near the image surface IMG of the optical photographing system.

The detailed optical data of the 6th embodiment are shown in Table 11 and the aspheric surface data are shown in Table 12 below.

TABLE 11

6th Embodiment
f = 6.48 mm, Fno = 1.64, HFOV = 48.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 160.0026 | (ASP) | 0.700 | Glass | 1.693 | 53.2 | −8.57 |
| 2 | | 5.7194 | (ASP) | 2.011 | | | | |
| 3 | Lens 2 | 42.0650 | (SPH) | 2.227 | Glass | 1.923 | 20.9 | 16.78 |
| 4 | | −23.8861 | (SPH) | −0.082 | | | | |
| 5 | Ape. Stop | Plano | | 0.483 | | | | |
| 6 | Lens 3 | −8.3950 | (SPH) | 3.128 | Glass | 1.847 | 23.8 | −10.50 |
| 7 | | −175.4386 | (SPH) | 0.005 | Cemented | 1.514 | 38.8 | |
| 8 | Lens 4 | −175.4386 | (SPH) | 2.365 | Glass | 1.729 | 54.7 | 12.36 |
| 9 | | −8.6236 | (SPH) | 0.491 | | | | |
| 10 | Stop | Plano | | −0.441 | | | | |
| 11 | Lens 5 | 14.6621 | (ASP) | 4.203 | Glass | 1.806 | 40.7 | 8.49 |
| 12 | | −11.1977 | (ASP) | 0.050 | | | | |
| 13 | Lens 6 | −188.6792 | (SPH) | 3.231 | Glass | 1.729 | 54.7 | 11.48 |
| 14 | | −8.0719 | (SPH) | 0.005 | Cemented | 1.514 | 38.8 | |
| 15 | Lens 7 | −8.0719 | (SPH) | 0.700 | Glass | 1.805 | 25.5 | −5.30 |
| 16 | | 9.4058 | (SPH) | 1.491 | | | | |
| 17 | Lens 8 | 12.3839 | (SPH) | 4.985 | Glass | 1.729 | 54.7 | 16.14 |
| 18 | | −196.0784 | (SPH) | 1.500 | | | | |
| 19 | Filter | Plano | | 0.900 | Glass | 1.517 | 64.2 | — |
| 20 | | Plano | | 2.049 | | | | |
| 21 | Image | Plano | | — | | | | |

Note:
Reference wavelength is 587.6 nm (d-line).
An effective radius of the stop S1 (Surface 10) is 5.552 mm.

TABLE 12

Aspheric Coefficients

| | Surface # | | | |
|---|---|---|---|---|
| | 1 | 2 | 11 | 12 |
| k = | −9.50000E+01 | −1.53989E+00 | 2.32410E+00 | 5.01794E−02 |
| A4 = | 1.90650E−03 | 3.77588E−03 | −1.91023E−04 | 2.26127E−04 |
| A6 = | −1.57390E−04 | −2.97686E−05 | 3.12020E−06 | 2.39755E−06 |
| A8 = | 8.38189E−06 | −7.16523E−06 | −1.35758E−07 | 2.25216E−08 |
| A10 = | −2.32138E−07 | 1.26619E−06 | 4.41087E−09 | −1.74476E−09 |
| A12 = | 2.52835E−09 | −1.77876E−08 | −1.93072E−11 | 9.27030E−11 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.48 | TL/ImgH | 5.83 |
| Fno | 1.64 | ΣCT/ΣAT | 5.37 |
| HFOV [deg.] | 48.9 | (R9 + R10)/(R9 − R10) | 0.13 |
| V1/N1 | 31.41 | R1/R2 | 27.98 |
| V5/N5 | 22.55 | f/f1 | −0.76 |
| V4/V3 | 2.30 | f/f5 | 0.76 |
| V6/V7 | 2.15 | f/f34 | 0.07 |
| (T12 + T23)/CT2 | 1.08 | f/f67 | −0.65 |
| CT6/T45 | 64.62 | ImgH/EPD | 1.30 |
| CTmax/ATmax | 2.48 | Y11/ImgH | 0.87 |
| SL/TL | 0.84 | Y11/Y52 | 0.77 |

| 6th Embodiment | | | |
|---|---|---|---|
| TD/T23 | 63.72 | Y11/Y82 | 0.84 |
| TL/f | 4.63 | Ymax/Ymin | 2.18 |

7th Embodiment

Figure 13:
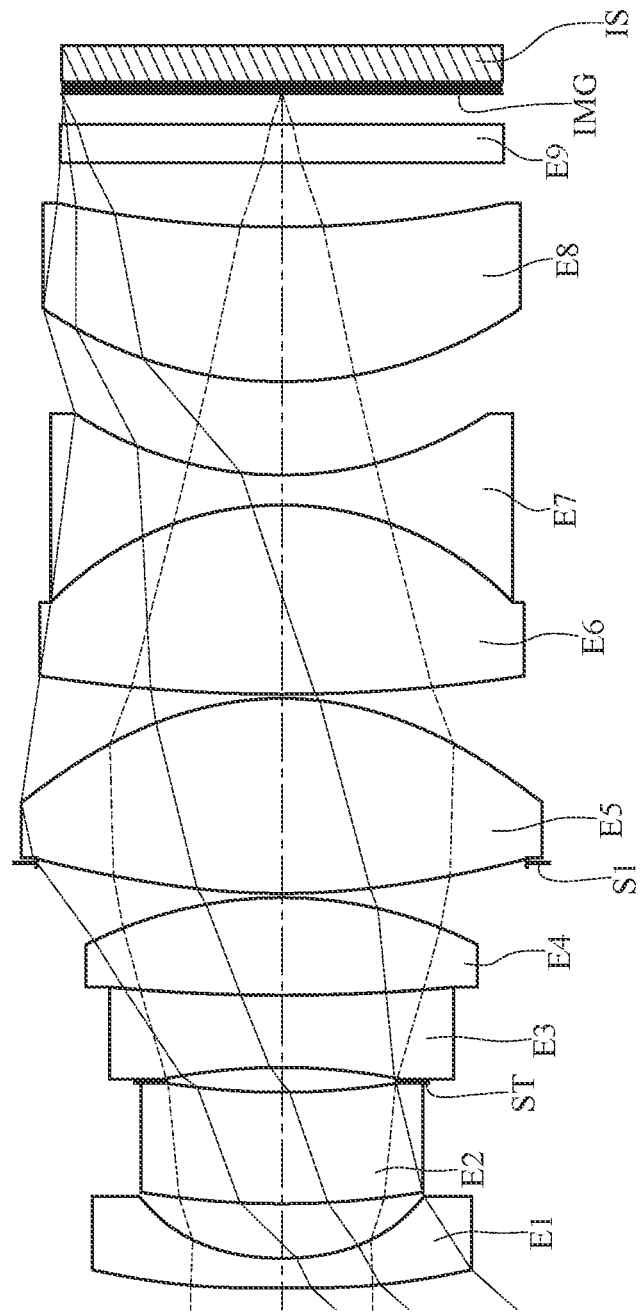
FIG. 13 is a schematic view of an image capturing unit according to the 7th embodiment of the present disclosure.
Figure 14:
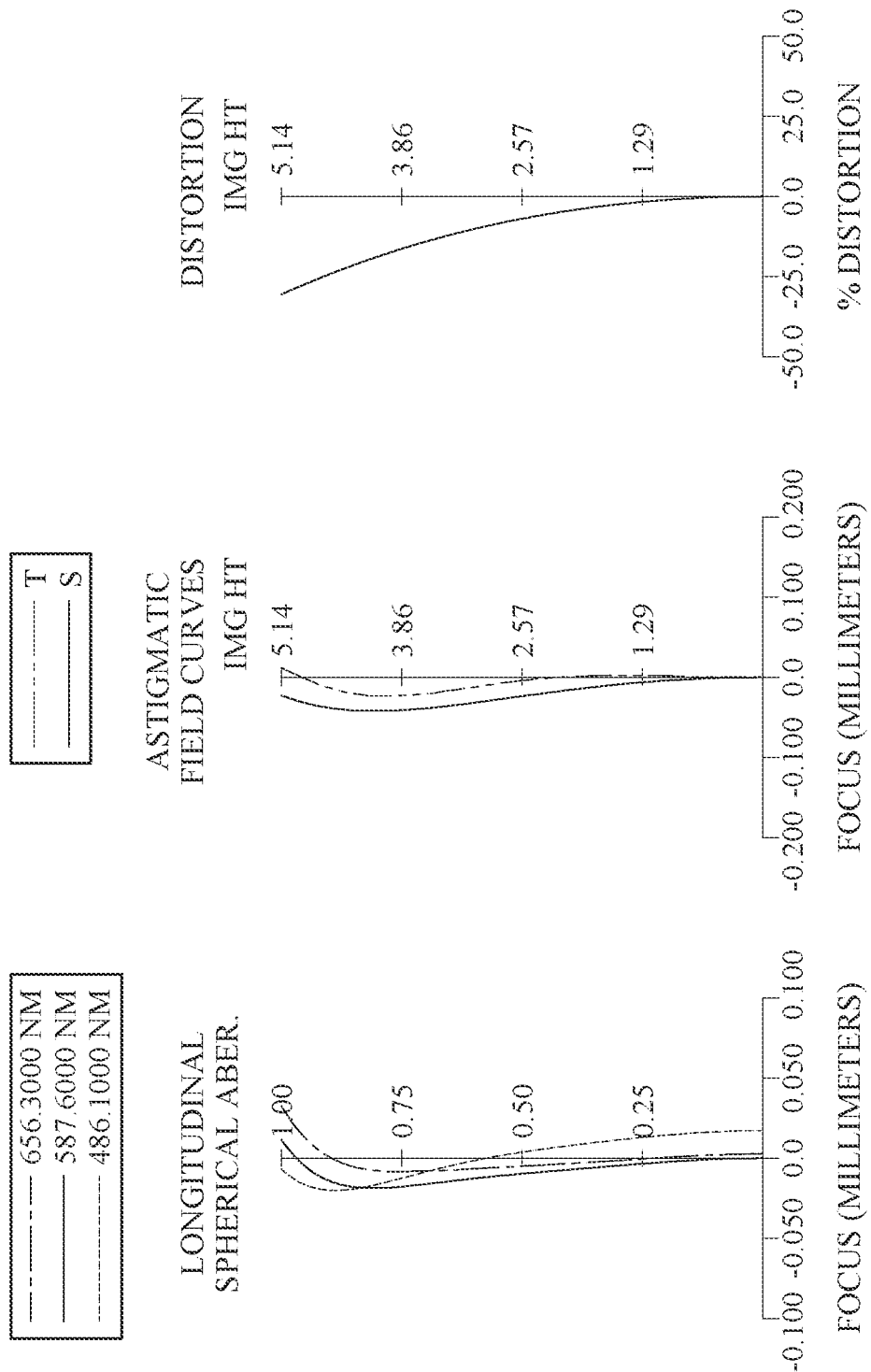
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the optical photographing system (its reference numeral is omitted) of the present disclosure and an image sensor IS. The optical photographing system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, an eighth lens element E8, a filter E9 and an image surface IMG. The optical photographing system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical. The object-side surface of the fourth lens element E4 is cemented to the image-side surface of the third lens element E3.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of glass material and has the object-side surface and the image-side surface being both spherical. The object-side surface of the seventh lens element E7 is cemented to the image-side surface of the sixth lens element E6.

The eighth lens element E8 with positive refractive power has an object-side surface being convex in a paraxial region thereof and an image-side surface being concave in a paraxial region thereof. The eighth lens element E8 is made of glass material and has the object-side surface and the image-side surface being both spherical.

The filter E9 is made of glass material and located between the eighth lens element E8 and the image surface IMG, and will not affect the focal length of the optical photographing system. The image sensor IS is disposed on or near the image surface IMG of the optical photographing system.

The detailed optical data of the 7th embodiment are shown in Table 13 and the aspheric surface data are shown in Table 14 below.

TABLE 13

7th Embodiment
f = 6.51 mm, Fno = 1.53, HFOV = 48.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 94.5078 | (ASP) | 0.700 | Glass | 1.693 | 53.2 | −9.63 |
| 2 | | 6.2192 | (ASP) | 1.273 | | | | |
| 3 | Lens 2 | 20.1069 | (SPH) | 2.617 | Glass | 1.923 | 18.9 | −211.26 |
| 4 | | 17.0885 | (SPH) | 0.231 | | | | |
| 5 | Ape. Stop | Plano | | 0.351 | | | | |
| 6 | Lens 3 | −14.0900 | (SPH) | 1.691 | Glass | 1.702 | 41.1 | −14.96 |
| 7 | | 43.1611 | (SPH) | 0.005 | Cemented | 1.514 | 38.8 | |
| 8 | Lens 4 | 43.1611 | (SPH) | 2.285 | Glass | 1.772 | 49.6 | 10.77 |
| 9 | | −10.0657 | (SPH) | 0.821 | | | | |
| 10 | Stop | Plano | | −0.721 | | | | |
| 11 | Lens 5 | 17.1449 | (ASP) | 4.570 | Glass | 1.697 | 55.5 | 8.18 |
| 12 | | −7.6073 | (ASP) | 0.100 | | | | |
| 13 | Lens 6 | 37.7720 | (SPH) | 4.430 | Glass | 1.729 | 54.7 | 9.00 |
| 14 | | −7.5545 | (SPH) | 0.005 | Cemented | 1.514 | 38.8 | |
| 15 | Lens 7 | −7.5545 | (SPH) | 0.700 | Glass | 1.755 | 27.5 | −5.30 |
| 16 | | 8.8614 | (SPH) | 2.187 | | | | |
| 17 | Lens 8 | 9.9513 | (SPH) | 3.629 | Glass | 1.729 | 54.7 | 20.59 |
| 18 | | 24.9641 | (SPH) | 1.500 | | | | |
| 19 | Filter | Plano | | 0.900 | Glass | 1.517 | 64.2 | — |
| 20 | | Plano | | 0.722 | | | | |
| 21 | Image | Plano | | — | | | | |

Note:
Reference wavelength is 587.6 nm (d-line).
An effective radius of the stop S1 (Surface 10) is 5.737 mm.

TABLE 14

Aspheric Coefficients

| | Surface # | | | |
|---|---|---|---|---|
| | 1 | 2 | 11 | 12 |
| k = | 1.33586E+01 | −3.26032E−01 | 4.59558E+00 | −1.33390E−01 |
| A4 = | 3.01357E−03 | 4.57977E−03 | −3.39455E−04 | 2.49727E−04 |
| A6 = | −2.70247E−04 | −9.54917E−05 | 9.40572E−07 | 5.21954E−08 |
| A8 = | 1.43866E−05 | −1.16100E−05 | −8.05622E−08 | 1.22620E−07 |
| A10 = | −4.18729E−07 | 2.14976E−06 | 2.02512E−09 | −3.44513E−09 |
| A12 = | 5.09436E−09 | −5.67885E−08 | −2.41843E−11 | 6.07674E−11 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.51 | TL/ImgH | 5.44 |
| Fno | 1.53 | ΣCT/ΣAT | 4.85 |
| HFOV [deg.] | 48.7 | (R9 + R10)/(R9 − R10) | 0.39 |
| V1/N1 | 31.41 | R1/R2 | 15.20 |
| V5/N5 | 32.73 | f/f1 | −0.68 |
| V4/V3 | 1.21 | f/f5 | 0.80 |
| V6/V7 | 1.98 | f/f34 | 0.24 |
| (T12 + T23)/CT2 | 0.71 | f/f67 | −0.42 |
| CT6/T45 | 44.30 | ImgH/EPD | 1.21 |
| CTmax/ATmax | 2.09 | Y11/ImgH | 0.86 |
| SL/TL | 0.83 | Y11/Y52 | 0.73 |
| TD/T23 | 42.74 | Y11/Y82 | 0.84 |
| TL/f | 4.30 | Ymax/Ymin | 2.28 |

8th Embodiment

Figure 15:
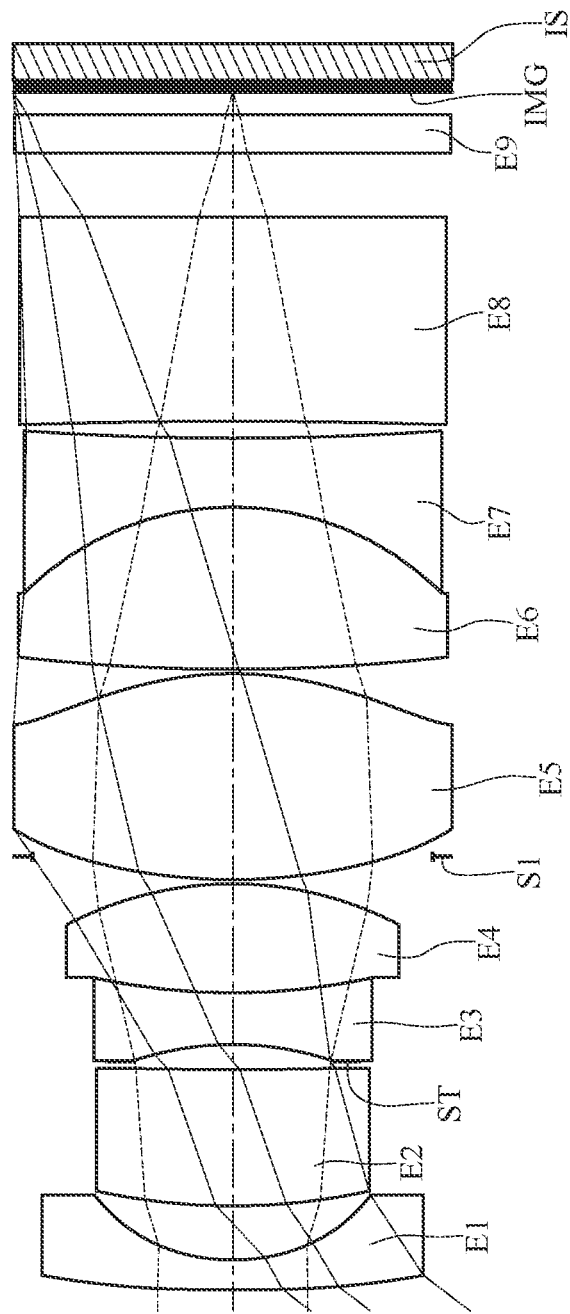
FIG. 15 is a schematic view of an image capturing unit according to the 8th embodiment of the present disclosure.
Figure 16:
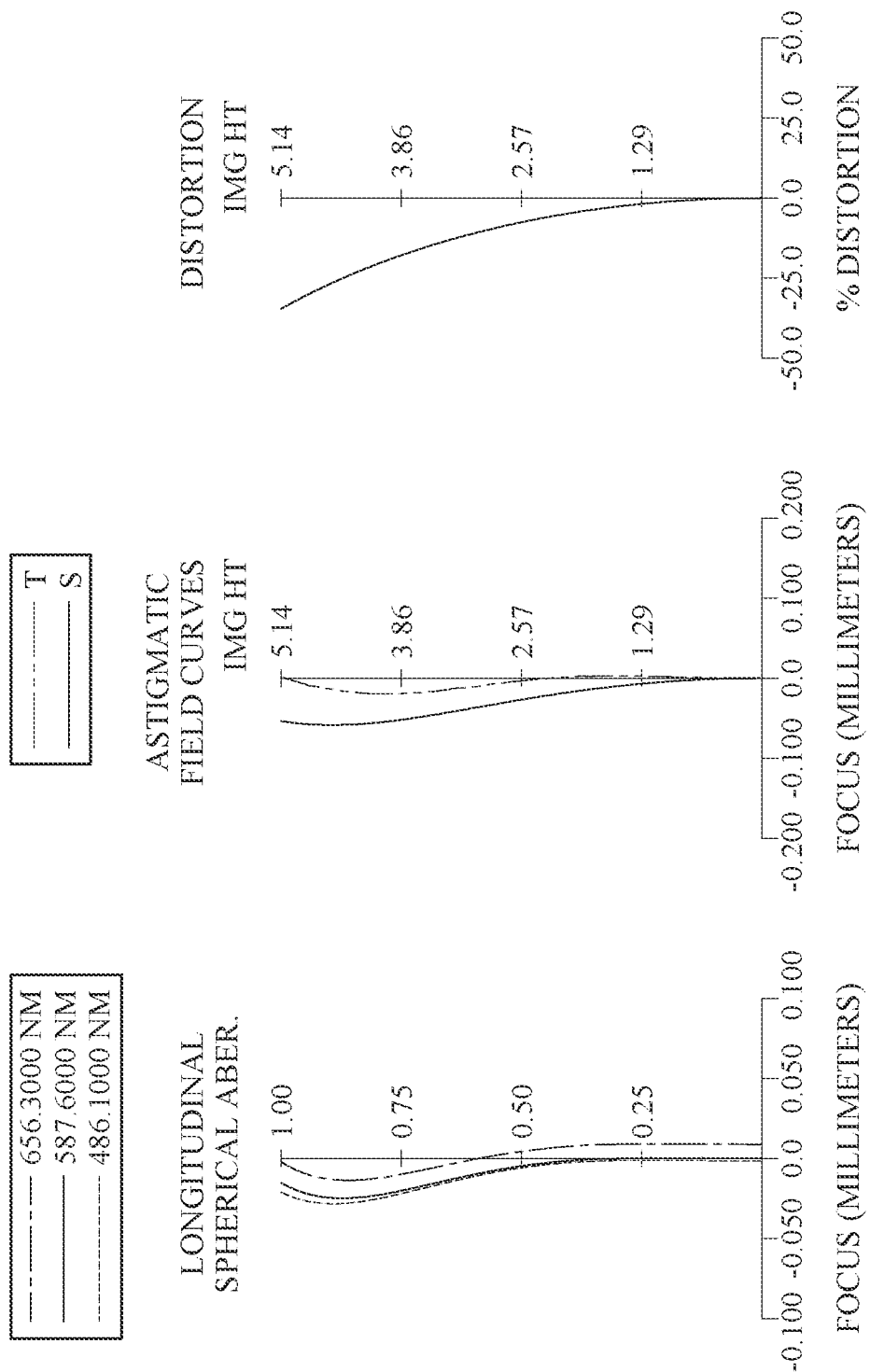
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the optical photographing system (its reference numeral is omitted) of the present disclosure and an image sensor IS. The optical photographing system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, an eighth lens element E8, a filter E9 and an image surface IMG. The optical photographing system includes eight lens elements (E1, E2, E3, E4, E5, E6, E7 and E8) with no additional lens element disposed between each of the adjacent eight lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being concave in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being concave in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of glass material and has the object-side surface and the image-side surface being both spherical. The object-side surface of the fourth lens element E4 is cemented to the image-side surface of the third lens element E3.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of glass material and has the object-side surface and the image-side surface being both spherical.

The seventh lens element E7 with negative refractive power has an object-side surface being concave in a paraxial region thereof and an image-side surface being concave in a paraxial region thereof. The seventh lens element E7 is made of glass material and has the object-side surface and the image-side surface being both spherical. The object-side surface of the seventh lens element E7 is cemented to the image-side surface of the sixth lens element E6.

The eighth lens element E8 with negative refractive power has an object-side surface being concave in a paraxial region thereof and an image-side surface being planar in a paraxial region thereof. The eighth lens element E8 is made of glass material and has the object-side surface being spherical.

The filter E9 is made of glass material and located between the eighth lens element E8 and the image surface IMG, and will not affect the focal length of the optical photographing system. The image sensor IS is disposed on or near the image surface IMG of the optical photographing system.

The detailed optical data of the 8th embodiment are shown in Table 15 and the aspheric surface data are shown in Table 16 below.

TABLE 15

8th Embodiment
f = 6.04 mm, Fno = 1.72, HFOV = 52.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 88.6571 | (ASP) | 0.700 | Glass | 1.693 | 53.2 | −7.33 |
| 2 | | 4.7898 | (ASP) | 1.262 | | | | |
| 3 | Lens 2 | 14.5729 | (SPH) | 3.200 | Glass | 2.001 | 25.4 | 16.80 |
| 4 | | 97.3178 | (SPH) | 0.194 | | | | |
| 5 | Ape. Stop | Plano | | 0.399 | | | | |
| 6 | Lens 3 | −7.2385 | (SPH) | 1.200 | Glass | 1.723 | 38.0 | −6.61 |
| 7 | | 15.0713 | (SPH) | 0.005 | Cemented | 1.514 | 38.8 | |
| 8 | Lens 4 | 15.0713 | (SPH) | 2.556 | Glass | 1.713 | 53.9 | 7.90 |
| 9 | | −8.3557 | (SPH) | 0.635 | | | | |
| 10 | Stop | Plano | | −0.535 | | | | |
| 11 | Lens 5 | 13.2339 | (ASP) | 4.828 | Glass | 1.693 | 53.2 | 8.14 |
| 12 | | −8.3706 | (ASP) | 0.100 | | | | |
| 13 | Lens 6 | 43.9670 | (SPH) | 3.802 | Glass | 1.729 | 54.7 | 8.49 |
| 14 | | −6.9378 | (SPH) | 0.005 | Cemented | 1.514 | 38.8 | |
| 15 | Lens 7 | −6.9378 | (SPH) | 1.611 | Glass | 1.847 | 23.8 | −7.38 |
| 16 | | 69.2926 | (SPH) | 0.399 | | | | |
| 17 | Lens 8 | −144.9275 | (SPH) | 4.782 | Glass | 1.564 | 60.8 | −257.02 |
| 18 | | Plano | | 1.500 | | | | |
| 19 | Filter | Plano | | 0.900 | Glass | 1.517 | 64.2 | — |
| 20 | | Plano | | 0.530 | | | | |
| 21 | Image | Plano | | — | | | | |

Note:
Reference wavelength is 587.6 nm (d-line).
An effective radius of the stop S1 (Surface 10) is 4.686 mm.

TABLE 16

Aspheric Coefficients

| | Surface # | | | |
|---|---|---|---|---|
| | 1 | 2 | 11 | 12 |
| k = | 3.15559E+01 | −1.06398E+00 | 3.19431E+00 | −3.15105E−01 |
| A4 = | 1.93084E−03 | 3.72900E−03 | −2.51288E−04 | 3.55318E−04 |
| A6 = | −1.76036E−04 | 4.68685E−06 | 1.09754E−05 | 3.40957E−06 |
| A8 = | 9.74962E−06 | −1.80447E−05 | −5.45247E−07 | 4.57619E−07 |
| A10 = | −2.82761E−07 | 2.68157E−06 | 2.46513E−08 | −1.97328E−08 |
| A12 = | 3.22836E−09 | −6.93391E−08 | −3.77266E−10 | 6.21348E−10 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.04 | TL/ImgH | 5.46 |
| Fno | 1.72 | ΣCT/ΣAT | 9.20 |
| HFOV [deg.] | 52.5 | (R9 + R10)/(R9 − R10) | 0.23 |
| V1/N1 | 31.41 | R1/R2 | 18.51 |
| V5/N5 | 31.41 | f/f1 | −0.82 |
| V4/V3 | 1.42 | f/f5 | 0.74 |
| V6/V7 | 2.30 | f/f34 | 0.02 |
| (T12 + T23)/CT2 | 0.58 | f/f67 | −0.07 |
| CT6/T45 | 38.02 | ImgH/EPD | 1.46 |
| CTmax/ATmax | 3.83 | Y11/ImgH | 0.87 |
| SL/TL | 0.81 | Y11/Y52 | 0.87 |

-continued

| 8th Embodiment | | | |
|---|---|---|---|
| TD/T23 | 42.40 | Y11/Y82 | 0.89 |
| TL/f | 4.65 | Ymax/Ymin | 2.22 |

9th Embodiment

Figure 17:
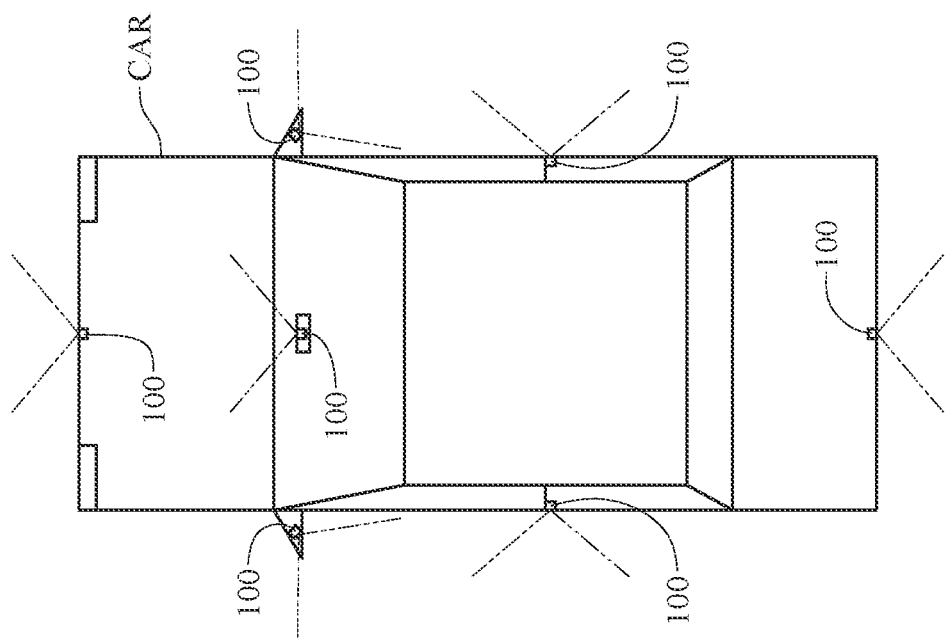
FIG. 17 is a schematic view for showing arrangements of image capturing units according to the 9th embodiment of the present disclosure.

FIG. 17 is a schematic view for showing arrangements of image capturing units according to the 9th embodiment of the present disclosure. In this embodiment, an image capturing unit 100 is a camera module including a lens unit, a driving device, an image sensor and an image stabilizer (not shown). The lens unit includes the optical photographing system disclosed in the 1st embodiment, a barrel and a holder member for holding the optical photographing system. However, the lens unit may alternatively be provided with the optical photographing system disclosed in other embodiments of the present disclosure, and the present disclosure is not limited thereto. The imaging light converges in the lens unit of the image capturing unit 100 to generate an image with the driving device utilized for image focusing on the image sensor, and the generated image is then digitally transmitted to other electronic component for further processing.

The driving device can have auto focusing functionality, and different driving configurations can be obtained through the usages of voice coil motors (VCM), micro electromechanical systems (MEMS), piezoelectric systems, or shape memory alloy materials. The driving device is favorable for obtaining a better imaging position of the lens unit, so that a clear image of the imaged object can be captured by the lens unit with different object distances. The image sensor (for example, CCD or CMOS), which can feature high photosensitivity and low noise, is disposed on the image surface of the optical photographing system to provide higher image quality.

The image stabilizer, such as an accelerometer, a gyro sensor and a Hall Effect sensor, is configured to work with the driving device to provide optical image stabilization (OIS). The driving device working with the image stabilizer is favorable for compensating for pan and tilt of the lens unit to reduce blurring associated with motion during exposure. In some cases, the compensation can be provided by electronic image stabilization (EIS) with image processing software, thereby improving image quality while in motion or low-light conditions.

The number of the image capturing unit 100 is plural, and each of the image capturing units 100 is a wide-angle image capturing unit. As shown in FIG. 17, the image capturing units 100 can be disposed at the front side, the rear side, the lateral sides, the inner side or on the rear-view mirrors of a car CAR for detecting ambient conditions of the car CAR. Also, the image capturing units 100 can be in communication connection with the processing system of the car CAR to be a driver assistance system or an autopilot system. Note that the arrangement positions of the image capturing units 100 are only exemplary, and the number, the positions and the orientations of the image capturing units 100 can be adjusted according to actual requirements.

Moreover, any of the image capturing units 100 can have a light-folding element configuration, and the light-folding element configuration of the one of the image capturing units 100 can be similar to, for example, one of the structures shown in FIG. 19 to FIG. 21, which can be referred to foregoing descriptions corresponding to FIG. 19 to FIG. 21, and the details in this regard will not be provided again.

The car in this embodiment is only exemplary for showing the image capturing unit of the present disclosure installed in a movable device, and the present disclosure is not limited thereto. The image capturing unit can be optionally applied to optical systems with a movable focus. Furthermore, the optical photographing system of the image capturing unit features good capability in aberration corrections and high image quality, and can be applied to 3D (three-dimensional) image capturing applications, in products such as digital cameras, mobile devices, digital tablets, smart televisions, network surveillance devices, smart phones, multi-camera devices, image recognition systems, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein a total number of lens elements of the optical photographing system is eight, the object-side surface of the third lens element is concave in a paraxial region thereof, the fourth lens element has positive refractive power, the fifth lens element has positive refractive power, the image-side surface of the fifth lens element is convex in a paraxial region thereof, the sixth lens element has positive refractive power, the seventh lens element has negative refractive power, and the image-side surface of the seventh lens element is concave in a paraxial region thereof;

wherein a sum of central thicknesses of all lens elements of the optical photographing system is $\Sigma CT$, a sum of axial distances between each of all adjacent lens elements of the optical photographing system is $\Sigma AT$, an axial distance between the object-side surface of the first lens element and an image surface is TL, a focal length of the optical photographing system is f, a maximum image height of the optical photographing system is ImgH, an f-number of the optical photographing system is Fno, and the following conditions are satisfied:

$3.0 < \Sigma CT/\Sigma AT$;

$4.0 < TL/f < 5.5$;

$5.0 < TL/\text{ImgH} < 6.5$; and $1.2 < Fno < 2.0$.

2. The optical photographing system of claim 1, wherein the sum of central thicknesses of all lens elements of the optical photographing system is $\Sigma CT$, the sum of axial distances between each of all adjacent lens elements of the optical photographing system is $\Sigma AT$, and the following condition is satisfied:

$3.5 < \Sigma CT/\Sigma AT < 15$.

3. The optical photographing system of claim 1, wherein the maximum image height of the optical photographing system is ImgH, an entrance pupil diameter of the optical photographing system is EPD, and the following condition is satisfied:

$1.1 < \text{ImgH}/EPD < 2.3$.

4. The optical photographing system of claim 1, wherein a maximum effective radius of the object-side surface of the first lens element is Y11, a maximum effective radius of the image-side surface of the eighth lens element is Y82, and the following condition is satisfied:

$0.70 < Y11/Y82 < 1.0$.

5. The optical photographing system of claim 1, further comprising an aperture stop, wherein the object-side surface of the seventh lens element is concave in a paraxial region thereof;
wherein an axial distance between the aperture stop and the image surface is SL, the axial distance between the object-side surface of the first lens element and the image surface is TL, and the following condition is satisfied:

0.75<$SL/TL$<0.90.

6. The optical photographing system of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, the object-side surface and the image-side surface of at least one lens element of the optical photographing system are both aspheric, and the at least one lens element satisfying the following condition:

20.0<$Vi/Ni$<35.0, wherein $i$=1,2,3,4,5,6,7 or 8.

7. An optical photographing system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;
wherein a total number of lens elements of the optical photographing system is eight, the first lens element has negative refractive power, the object-side surface of the third lens element is concave in a paraxial region thereof, the fourth lens element has positive refractive power, the fifth lens element has positive refractive power, the sixth lens element has positive refractive power, the image-side surface of the sixth lens element is convex in a paraxial region thereof, the seventh lens element has negative refractive power, and the image-side surface of the seventh lens element is concave in a paraxial region thereof;
wherein a sum of central thicknesses of all lens elements of the optical photographing system is ΣCT, a sum of axial distances between each of all adjacent lens elements of the optical photographing system is ΣAT, a maximum value among maximum effective radii on the object-side surfaces and the image-side surfaces of all lens elements of the optical photographing system is Ymax, a minimum value among maximum effective radii on the object-side surfaces and the image-side surfaces of all lens elements of the optical photographing system is Ymin, and the following conditions are satisfied:

2.5<Σ$CT$/Σ$AT$; and 2.0<$Ymax/Ymin$<2.5.

8. The optical photographing system of claim 7, wherein the sum of central thicknesses of all lens elements of the optical photographing system is ΣCT, the sum of axial distances between each of all adjacent lens elements of the optical photographing system is ΣAT, and the following condition is satisfied:

3.0<Σ$CT$/Σ$AT$<20.

9. The optical photographing system of claim 7, wherein a central thickness of the sixth lens element is CT6, an axial distance between the fourth lens element and the fifth lens element is T45, and the following condition is satisfied:

28.0<$CT6/T45$<100.

10. The optical photographing system of claim 7, wherein a maximum value among central thicknesses of all lens elements of the optical photographing system is CTmax, a maximum value among axial distances between each of all adjacent lens elements of the optical photographing system is ATmax, and the following condition is satisfied:

11.3<$CTmax/ATmax$<5.5.

11. The optical photographing system of claim 7, wherein an axial distance between the first lens element and the second lens element is T12, an axial distance between the second lens element and the third lens element is T23, a central thickness of the second lens element is CT2, and the following condition is satisfied:

0.45<($T12+T23$)/$CT2$<1.5.

12. The optical photographing system of claim 7, wherein an axial distance between the object-side surface of the first lens element and an image surface is TL, a focal length of the optical photographing system is f, a maximum image height of the optical photographing system is ImgH, and the following conditions are satisfied:

4.0<$TL/f$<5.5; and 5.0<$TL$/ImgH<6.5.

13. The optical photographing system of claim 7, wherein the sixth lens element and the seventh lens element are cemented to each other;
wherein an Abbe number of the sixth lens element is V6, an Abbe number of the seventh lens element is V7, a focal length of the optical photographing system is f, a composite focal length of the sixth lens element and the seventh lens element is f67, and the following conditions are satisfied:

1.6<$V6/V7$<2.6; and

−1.0<$f/f67$<0.

14. The optical photographing system of claim 7, wherein the object-side surface of the first lens element is convex in a paraxial region thereof, the image-side surface of the first lens element is concave in a paraxial region thereof, the image-side surface of the fourth lens element is convex in a paraxial region thereof, and the object-side surface of the fifth lens element is convex in a paraxial region thereof.

15. An optical photographing system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;
- wherein a total number of lens elements of the optical photographing system is eight, the first lens element has negative refractive power, the third lens element has negative refractive power, the object-side surface of the third lens element is concave in a paraxial region thereof, the fourth lens element has positive refractive power, the fifth lens element has positive refractive power, the object-side surface of the fifth lens element is convex in a paraxial region thereof, the image-side surface of the fifth lens element is convex in a paraxial region thereof, the sixth lens element has positive refractive power, the seventh lens element has negative refractive power, and the image-side surface of the seventh lens element is concave in a paraxial region thereof;
- wherein a sum of central thicknesses of all lens elements of the optical photographing system is ΣCT, a sum of axial distances between each of all adjacent lens elements of the optical photographing system is ΣAT, an f-number of the optical photographing system is Fno, a curvature radius of the object-side surface of the fifth lens element is R9, a curvature radius of the image-side surface of the fifth lens element is R10, and the following conditions are satisfied:

2.5<ΣCT/ΣAT;

1.2<Fno<2.0; and

0<(R9+R10)/(R9−R10)<0.50.

16. The optical photographing system of claim 15, wherein the sum of central thicknesses of all lens elements of the optical photographing system is ΣCT, the sum of axial distances between each of all adjacent lens elements of the optical photographing system is ΣAT, and the following condition is satisfied:

35.0<ΣCT/ΣAT<20.

17. The optical photographing system of claim 15, wherein an axial distance between the object-side surface of the first lens element and the image-side surface of the eighth lens element is TD, an axial distance between the second lens element and the third lens element is T23, and the following condition is satisfied:

35.0<TD/T23.

18. The optical photographing system of claim 15, wherein a focal length of the optical photographing system is f, a focal length of the first lens element is f1, a focal length of the fifth lens element is f5, and the following conditions are satisfied:

−1.0<f/f1<−0.60; and 0.30<f/f5<1.0.

19. The optical photographing system of claim 15, wherein a maximum effective radius of the object-side surface of the first lens element is Y11, a maximum effective radius of the image-side surface of the fifth lens element is Y52, and the following condition is satisfied:

0.50<Y11/Y52<1.1.

20. The optical photographing system of claim 15, wherein the third lens element and the fourth lens element are cemented to each other;
- wherein an Abbe number of the third lens element is V3, an Abbe number of the fourth lens element is V4, a focal length of the optical photographing system is f, a composite focal length of the third lens element and the fourth lens element is f34, and the following conditions are satisfied:

1.1<V4/V3<2.5; and

|f/f34|<0.25.

21. The optical photographing system of claim 15, wherein the object-side surface of the first lens element is convex in a paraxial region thereof, and the image-side surface of the first lens element is concave in a paraxial region thereof;
- wherein a curvature radius of the object-side surface of the first lens element is R1, a curvature radius of the image-side surface of the first lens element is R2, and the following condition is satisfied:

5.7<R1/R2.

22. The optical photographing system of claim 15, wherein the image-side surface of the fourth lens element is convex in a paraxial region thereof;
- wherein half of a maximum field of view of the optical photographing system is HFOV, and the following condition is satisfied:

40.0[deg.]<HFOV<70.0[deg.].

23. The optical photographing system of claim 15, wherein a maximum effective radius of the object-side surface of the first lens element is Y11, a maximum image height of the optical photographing system is ImgH, and the following condition is satisfied:

0.70<Y11/ImgH<1.0.

24. An image capturing unit, comprising:
the optical photographing system of claim 15; and
an image sensor disposed on an image surface of the optical photographing system.

* * * * *